(12) United States Patent
Jacobsen et al.

(10) Patent No.: US 8,977,087 B2
(45) Date of Patent: Mar. 10, 2015

(54) TAPERED OPTICAL FIBER FOR SUPERCONTINUUM GENERATION

(75) Inventors: Christian Jacobsen, Virum (DK); Ole Bang, Virum (DK); Simon Toft Sørensen, Copenhagen NV (DK); Peter Morten Moselund, Copenhagen N (DK); Carsten L. Thomsen, Virum (DK)

(73) Assignee: NKT Photonics A/S, Birkerod (DK)

( * ) Notice: Subject to any disclaimer, the term of this patent is extended or adjusted under 35 U.S.C. 154(b) by 189 days.

(21) Appl. No.: 13/820,032

(22) PCT Filed: Aug. 30, 2011

(86) PCT No.: PCT/DK2011/050328
§ 371 (c)(1),
(2), (4) Date: Apr. 4, 2013

(87) PCT Pub. No.: WO2012/028152
PCT Pub. Date: Mar. 8, 2012

(65) Prior Publication Data
US 2013/0182999 A1    Jul. 18, 2013

Related U.S. Application Data

(60) Provisional application No. 61/426,110, filed on Dec. 22, 2010.

(30) Foreign Application Priority Data

Aug. 30, 2010    (DK) .................................. 2010 00768

(51) Int. Cl.
*G02B 6/26*    (2006.01)
*G02B 6/02*    (2006.01)
(Continued)

(52) U.S. Cl.
CPC ........ *G02B 6/02004* (2013.01); *G02B 6/02376* (2013.01); *G02F 1/353* (2013.01);
(Continued)

(58) Field of Classification Search
CPC .................................................. G02B 6/02376
See application file for complete search history.

(56) References Cited

U.S. PATENT DOCUMENTS 6,654,522 B2 *  11/2003  Chandalia et al. .............. 385/48
7,403,688 B2    7/2008   Knox et al.
(Continued)

FOREIGN PATENT DOCUMENTS

JP    9-227149 A       9/1997
JP    2004-238246 A    8/2004
(Continued)

OTHER PUBLICATIONS

International Search Report (PCT/ISA/210) issued on Dec. 1, 2011, by the Danish Patent Office as the International Searching Authority for International Application No. PCT/DK2011/050328.
(Continued)

*Primary Examiner* — Rhonda Peace
(74) *Attorney, Agent, or Firm* — Buchanan Ingersoll & Rooney PC

(57) ABSTRACT

The invention relates to a tapered optical fiber and a method and drawing tower for producing such an optical fiber. The tapered optical fiber comprising a core region that is capable of guiding light along a longitudinal axis of said optical fiber and a cladding region surrounding said core region. The optical fiber comprises a tapered section arranged between a first longitudinal position and a second longitudinal position, said tapered section comprising a first taper section having a first length, $L_1$, over which the optical fiber is tapered down to a taper waist, and a second taper section having a second length, $L_2$, over which said optical fiber is tapered up.

25 Claims, 17 Drawing Sheets

(51) Int. Cl.
*G02F 1/35* (2006.01)
*G02F 1/365* (2006.01)
*C03B 37/025* (2006.01)
*C03B 37/027* (2006.01)
*C03B 37/029* (2006.01)
*C03B 37/03* (2006.01)
*G02B 6/42* (2006.01)

(52) U.S. Cl.
CPC ............ *G02F 1/365* (2013.01); *C03B 37/0253* (2013.01); *C03B 37/02763* (2013.01); *C03B 37/02781* (2013.01); *C03B 37/029* (2013.01); *C03B 37/032* (2013.01); *G02F 2001/3528* (2013.01); *C03B 2203/06* (2013.01); *C03B 2203/14* (2013.01); *C03B 2203/18* (2013.01); *C03B 2203/42* (2013.01); *C03B 2205/10* (2013.01)
USPC ......................................................... 385/43

(56) References Cited

U.S. PATENT DOCUMENTS

| | | | | |
|---|---|---|---|---|
| 7,742,665 | B2* | 6/2010 | Digonnet et al. | 385/43 |
| 8,009,948 | B2* | 8/2011 | Digonnet et al. | 385/43 |
| 8,699,833 | B2* | 4/2014 | Melin et al. | 385/27 |
| 2002/0114574 | A1* | 8/2002 | Chandalia et al. | 385/48 |
| 2003/0044159 | A1 | 3/2003 | Anderson et al. | |
| 2005/0094941 | A1 | 5/2005 | Knox | |
| 2006/0159398 | A1* | 7/2006 | Knox et al. | 385/43 |
| 2008/0050069 | A1 | 2/2008 | Skovgaard et al. | |
| 2008/0297804 | A1 | 12/2008 | Crowe | |
| 2013/0182999 | A1* | 7/2013 | Jacobsen et al. | 385/43 |
| 2013/0236153 | A1* | 9/2013 | Rochette et al. | 385/146 |
| 2013/0301663 | A1* | 11/2013 | Clowes et al. | 372/6 |

FOREIGN PATENT DOCUMENTS

| | | |
|---|---|---|
| WO | WO 92/10014 A1 | 6/1992 |
| WO | WO 2008/067823 A1 | 6/2008 |
| WO | WO 2009/043964 A1 | 4/2009 |
| WO | 2011/148080 A1 | 12/2011 |

OTHER PUBLICATIONS

Birks, T. A. et al., "Supercontinuum Generation in Tapered Fibers", Optics Letters, vol. 25, No. 19, pp. 1415-1417 (Oct. 1, 2000).

Pricking, S. et al., "Tapering Fibers With Complex Shape", Optics Express, vol. 18, No. 4, pp. 3426-3437 (Feb. 15, 2010).

Kudlinski, A. et al., "Control Of Pulse-To-Pulse Fluctuations In Visible Supercontinuum", vol. 18, No. 26, pp. 27445-27454 (Dec. 20, 2010).

Travers, J. C., "Blue Extension of Optical Fibre Supercontinuum Generation", J. Opt. 12, 113001 (19 pages) (2010).

\* cited by examiner

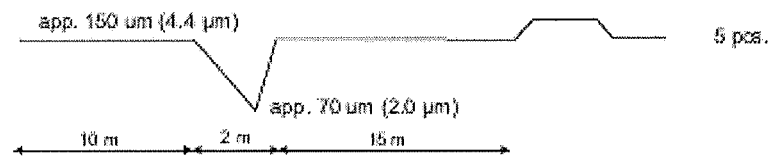
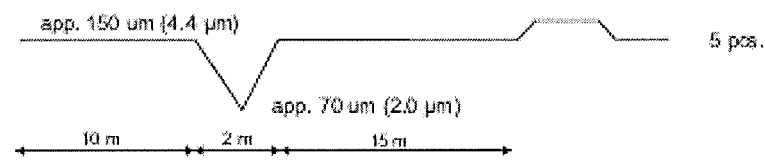
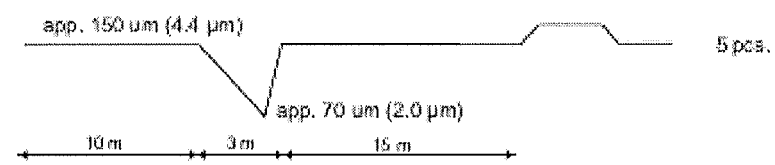
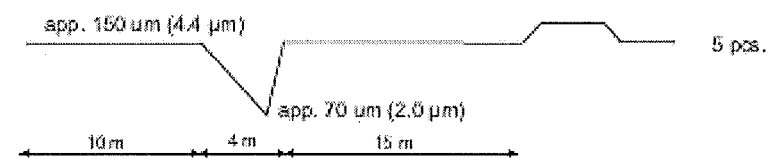
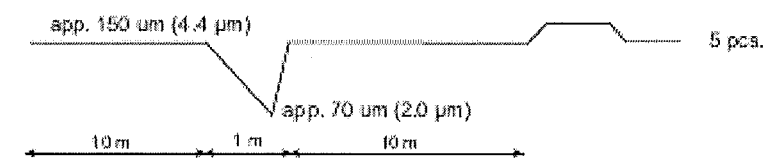
Fig. 4

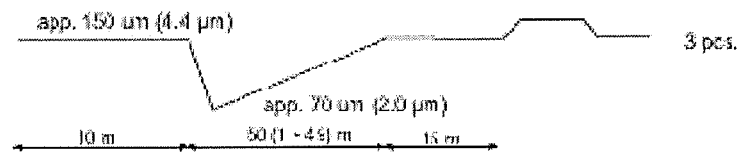
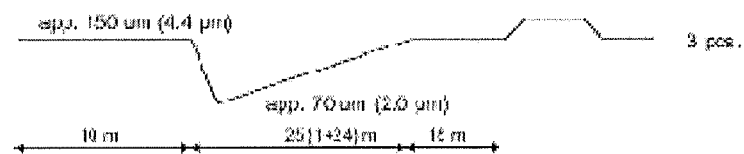
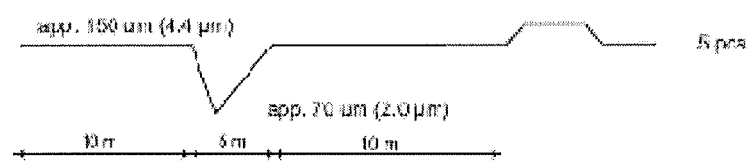
Fig. 5
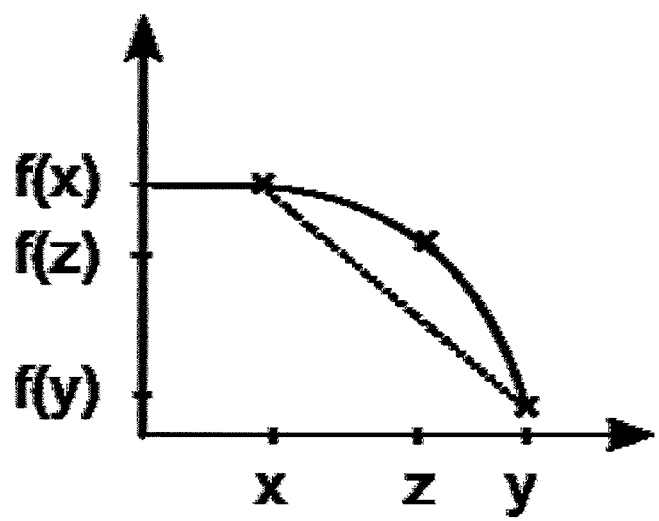
Fig. 6

TAPERED OPTICAL FIBER FOR SUPERCONTINUUM GENERATION

The invention relates to a tapered optical fiber and the production of such an optical fiber using for instance a drawing tower. A tapering of an optical fiber is advantageous in several systems, such as in a system for supercontinuum generation (SCG), where a tapering of e.g. a non-linear fiber according to the present invention may result in significant improvements over the prior art systems.

In prior art tapering of optical fibers have been performed on so-called tapering stations which are machines for post-processing of an optical fiber after it has been drawn. The fiber is typically stripped of its coating, tapered and recoated. Typically such tapers have a maximum length of about 0.5 meters. Tapers may also be produced during production of the fiber i.e. as a part of the drawing process in the drawing tower. These tapers are long and difficult to control over short distances, because the capstan, which controls the drawing speed, is inherently constructed to provide a very uniform fiber diameter.

As will be explained below the invention provides a new way of forming a taper on a drawing tower. By the invention such tapers are found to have particular use in supercontinuum generation because the inventors have found that the controllability of the taper along with the possibility of providing relatively long tapers (often 1-10 m) preferably combined with relatively short up tapering (often 0.3 m-1 m) is particularly advantageous for this application.

One object of the present invention is to provide a tapered optical fiber for super continuum generation, said tapered optical fiber comprising a core region that is capable of guiding light along a longitudinal axis of said optical fiber and a cladding region surrounding said core region. The optical fiber comprises a tapered section arranged between a first longitudinal position and a second longitudinal position, said tapered section comprising a first taper section having a first length, $L_1$, over which the optical fiber is tapered down to a taper waist, and a second taper section having a second length, $L_2$, over which said optical fiber is tapered up. An average gradient of a feature of said optical fiber along at least a part, such as the major part, of said second taper section is larger than the average gradient of the feature along at least a part, such as the major of said first taper section.

The fibers according to the invention are in one embodiment an intermediate product. The fiber may for example be produced on a drawing tower after which it is post-processed in a tapering station. In one embodiment the present invention relates to a system employing a fiber based on a fiber according to the invention as an intermediate product, such as a supercontinuum light source.

The first longitudinal position of the tapered section may be defined as the position, where the first taper section starts, i.e. where the feature of said optical fiber starts being reduced. The second longitudinal position of the tapered section may be defined as the position, where the second taper section ends, i.e. where the value of a feature of said optical fiber has increased from its value in the waist to a value which is substantially maintained for a length of the optical fiber, such as the length from the second taper section to an output end of said optical fiber. Variations in the feature of the optical fiber may occur outside the tapered section, such as in a pre-taper or a post taper section in which the dimensions and features of the optical fiber may change substantially. In one embodiment a pre-taper or post-taper is distinguishable by being less than 0.5 m, such as less than 0.4 m, such as less than 0.3 m, such as 0.2 m. In one embodiment a pre-taper or post-taper is distinguishable by being separated from the first or second taper sections by substantially untapered fiber longer than e.g. 0.5 m, such as longer 1 m, such as longer than 1.5 m. For example an untapered fiber having a gradient of less than 2% per meter, such as less than 1% per meter, such as less than 0.5% per meter. In one embodiment the pre-taper may be regarded as part of the first tapering section effectively extending the length of the first taper section. In one embodiment the end of second taper section is defined as the position where a feature of the fiber has increased sufficiently (e.g. for efficient coupling) from the waist (see below).

The first longitudinal position may be defined as the position at which a fraction of the reduction of said feature from its value at an input end to its value at the taper waist has occurred. This fraction may be in the range of about 0% to about 10%, such as in the range of about 1% to about 9%, such as in the range of about 2% to about 8%, such as in the range of about 3% to about 6%. In one embodiment the fraction is equal to 10%. In one embodiment the fraction is equal to 8%. In one embodiment the fraction is equal to 6%. In one embodiment the fraction is equal to 4%. In one embodiment the fraction is equal to 2%. In one embodiment the fraction is equal to 1%. In one embodiment the fraction is equal to 0.5%.

The second longitudinal position may be defined as the position at which a fraction of the increase of said feature from its value at the taper waist to its value at the fiber output has occurred. This fraction is in one embodiment in the range of about 90% to about 100%, such as in the range of about 91% to about 99%, such as in the range of about 92% to about 98%, such as in the range of about 93% to about 96%. In one embodiment the fraction is equal to 90%. In one embodiment the fraction is equal to 92%. In one embodiment the fraction is equal to 94%. In one embodiment the fraction is equal to 96%. In one embodiment the fraction is equal to 98%. In one embodiment the fraction is equal to 99%. In one embodiment the fraction is equal to 99.5%.

A fiber according to the invention may comprise multiple tapers each having a waist which is a local minimum in the feature. In the context of the present invention, the phrase "taper waist" may refer to the position along the optical fiber, at which a feature of the optical fiber has its minimum value. When the feature e.g. is the cross sectional area or the diameter of the optical fiber, the waist may be defined as the thinnest point of taper. In one embodiment the waist is defined as the position along the optical fiber, at which a feature of the optical fiber has its minimum value, such as the thinnest point of the taper.

The phrases "tapered up" and "tapered down" are not intended to limit the scope of the claims to situations where light propagates from the first longitudinal position towards the second longitudinal position. The tapered optical fibers, the methods and the drawing towers according to the present invention may also relate to embodiments, wherein light propagates from the second longitudinal position towards the first longitudinal position, in which situation the optical fiber is tapered down in the second taper section and tapered up in the first taper section. However, in one embodiment the application of the fiber is limited to an application where the light propagates from the first section to the second section.

The phrases "start of" and "end of" are merely used to describe the longitudinal extension of the different sections of the tapered optical fiber and do not necessarily present a limitation in the direction, in which light propagates through the optical fiber. The tapered optical fibers, the methods and the drawing towers according to the present invention may also relate to embodiments, wherein light propagates from the end to the start. This is e.g. the case for drawing towers according to the present invention, which may also be used to produce optical fibers, where a short down tapering is followed by a long up tapering. However, in one embodiment the application of the fiber is limited to an application where the light propagates from the start section towards the end section.

These comments are equally true for the use of the phrases "an input end" and "an output end", as well as the phrases "an input section" and "an output section". However, in one embodiment the application of the fiber is limited to an application where the light propagates from the first section to the second section.

In the context of the present invention, the phrase "supercontinuum" may refer to a spectrally broad signal. The supercontinuum is said to have a "blue edge" defining the lower boundary of the spectrum and a "red edge" defining the upper boundary of the spectrum. In a silica optical fiber, the blue edge may be at a wavelength in the range of 300 nm to 600 nm, such as in the range of 350 nm to 550 nm and the red edge may be at a wavelength in the range of 1300 nm to 2400 nm, such as in the range of 1600 nm to 2400 nm. In one embodiment the blues edge is at a wavelength less than 550 nm, such as less than 500 nm, such as less than 450 nm, such as less than 430 nm, such as less than 420 nm, such as less than 400 nm, such as less than 380 nm, such as less than 360 nm, such as less than 340 nm, such as lees than 320 nm. The spectral width of the supercontinuum may be defined as the difference between the wavelength of the red and blue-edges. The spectral width may be more than 100 nm, such as more than 150 nm, such as more than 300 nm, such as more than 500 nm, such as more than 750 nm, such as more than 1000 nm, such as more than 1500 nm, such as more than 2000 nm, such as more than 2500 nm, such as more than 3000 nm. In one embodiment the "blue edge" and the "red edge" is defined as the wavelength where a continuum of light drops below a spectral density of 5 dBm/nm, such as below a spectral density of 0 dBm/nm, such as below a spectral density of −5 dBm/nm, such as below a spectral density of −10 dBm/nm, such as below a spectral density −15 dBm/nm, such as below a spectral density below −20 dBm/nm. In some embodiments the supercontinuum may comprise dips in the spectrum where the supercontinuum is considered to extend across such dips. On the other hand the output may comprise spectral lines commonly having relatively low power below the blue edge. These lines are not considered part of the spectrum. In one embodiment the supercontinuum has a higher spectral density than at the blue edge for more than 10 nm above the blue edge, such as more than 50 nm above the blue edge, such as more than 100 nm above the blue edge, such as more than 200 nm above the blue edge, such as more than 500 nm above the blue edge, such as more than 1000 nm above the blue edge. In one embodiment such lines are multimode. In one embodiment only substantial single (transverse) mode light is considered part of the supercontinuum. Substantial single mode light being light where more than 80% of the light resides in the lowest order mode of the fiber at that wavelength, such as more than 90% of the light residing in the lowest order mode, such as more than 95% of the light residing in the lowest order mode, such as more than 98% of the light residing in the lowest order mode, such as more than 99% of the light residing in the lowest order mode, such as 100% of the light residing in the lowest order mode.

In the context of the present invention, the phrase "gradient" refers to the change per length along the longitudinal axis of the value of a given feature of said optical fiber, such as the change per meter in the cross sectional area of the core region. The gradients are expressed by the absolute value i.e. without a sign. For a section, where the rate of the change is substantially constant, the gradient may have a substantially constant value. The tapered section may also be such that the rate of the change varies along the tapered section. In this case, the gradient still has a local value. The average gradient of a taper section may be the average change over the taper section measured per unit length. In one embodiment for the first taper section the average gradient is defined as the difference in said feature from first longitudinal position to the waist divided by the length of the first taper section. Similarly for the second taper section, the average gradient is defined as the difference in said feature from the waist to the second longitudinal position divided by the length of the second taper section.

One object of the present invention is to provide a tapered optical fiber for SCG, said tapered optical fiber comprising a core region that is capable of guiding light along a longitudinal axis of said optical fiber and a cladding region surrounding said core region. A fiber suitable for SCG provides low loss over a substantial bandwidth relative to the length sufficient to generate an SCG. The optical fiber comprises a tapered section arranged between a first longitudinal position and a second longitudinal position, said tapered section comprising a first taper section having a first length, $L_1$, over which the optical fiber is tapered down to a taper waist, and a second taper section having a second length, $L_2$, over which said optical fiber is tapered up, wherein $L_2=y \cdot L_1$, where y is smaller than 1.

In one embodiment one object of the present invention is to provide a tapered optical fiber comprising a core region that is capable of low loss guiding of light over a substantial bandwidth along a longitudinal axis of said optical fiber and a cladding region, surrounding said core region. The optical fiber comprises a tapered section arranged between a first longitudinal position and a second longitudinal position, said tapered section comprising a first taper section having a first length, $L_1$, over which the optical fiber is tapered down to a taper waist, and a second taper section having a second length, $L_2$, over which said optical fiber is tapered up, wherein the sum of said first length and said second length, $L_2+L_1$, is larger than about 0.5 m.

In one embodiment an object of the present invention is to provide a supercontinuum light source comprising a tapered optical fiber according to the present invention and a pump source. The said core region of said optical fiber has an input core area, $A_{in}$, at an input end of said optical fiber and an output core area, $A_{out}$, at an output end of said optical fiber, said core region supporting at least a fundamental mode for light at a first wavelength, $\lambda_1$. The pump source is arranged to inject pump light into said core region at said input end of said optical fiber, said pump light having an optical peak power, P, a centre wavelength, $\lambda_{centre}$, and a spectral width, $\Delta\lambda$.

In one embodiment an object of the present invention is to provide a method for producing a tapered optical fiber from a fiber preform comprising at least a first material, said method comprising fixating said fiber preform in a preform holder and arranging said preform holder in relation to a drawing tower comprising a capstan and a heating device capable of heating at least a part of said fiber preform. The method further comprising feeding at a feeding velocity said fiber preform into said heating device and heating at least a part of said fiber preform in said heating device. The optical fiber is drawn from a first end of said heated fiber preform at a line speed by applying a pulling force to said first end, said pulling force being applied by a capstan. The capstan provides an acceleration and/or a deceleration such that said line speed changes from a first line speed to a second line speed during a shorter time interval, said first line speed differing by more than about 10% from said second line speed, and said shorter time interval being less than about 10 seconds. Features relating to the production and drawing tower discussed below apply equally to the method.

In one embodiment an object of the present invention is to provide a drawing tower system for producing a tapered optical fiber from a fiber preform comprising at least a first material, said drawing tower comprising a heating unit, a preform holder, a feeding unit, and a capstan. The preform holder is capable of fixating a second end of a fiber preform, and the feeding unit is capable of moving said preform holder relative to said heating unit at a feeding velocity, where the heating unit is capable of heating at least a part of said fiber preform. The capstan applies a pulling force to a first end of said fiber preform to draw an optical fiber from said first end of said fiber preform at a line speed, where said capstan is capable of providing an acceleration or a deceleration such that said line speed changes from a first line speed to a second line speed during a shorter time interval, said first line speed differing by more than about 10% from said second line speed, and said shorter time interval being less than about 10 seconds.

In one embodiment an object of the present invention is to provide a drawing tower system for producing a tapered optical fiber from a fiber preform comprising at least a first material and at least a first group of air holes, said drawing tower comprising a heating unit, a preform holder, a feeding unit, a capstan and a pressure control system for pressurizing said first group of air holes. The preform holder is capable of fixating a second end of a fiber preform, and the feeding unit is capable of moving said preform holder relative to said heating unit at a feeding velocity, where the heating unit is capable of heating at least a part of said fiber preform. The capstan applies a pulling force to a first end of said fiber preform to draw an optical fiber from said first end of said fiber preform at a line speed. The pressure control system comprising a first enclosure and a flow system connecting said first enclosure and the first group of air holes via a flow path, said pressure control system comprising a pump for pressurizing said first enclosure, said flow system comprising an on/off valve which is capable of opening within a first period of time $\Delta t_1$, said first enclosure being brought into fluid contact with said first group of air holes when said valve is opened, wherein $\Delta t_1$ is smaller than about 10 seconds. The first enclosure acts as a buffer reservoir which facilitates a fast pressure adjustment in the flow system when the on/off valve is opened.

In one embodiment an object of the present invention is to provide a drawing tower system for producing a tapered optical fiber from a fiber preform comprising at least a first material and at least a first group of air holes, said drawing tower comprising a heating unit, a preform holder, a feeding unit, a capstan and a pressure control system for pressurizing said first group of air holes. The preform holder is capable of fixating a second end of a fiber preform, and the feeding unit is capable of moving said preform holder relative to said heating unit at a feeding velocity, where the heating unit is capable of heating at least a part of said fiber preform. The capstan applies a pulling force to a first end of said fiber preform to draw an optical fiber from said first end of said fiber preform at a line speed. The pressure control system is capable of changing the pressure in a volume arranged in fluid contact with said first group of air holes by a first factor in a first period of time $\Delta t_1$, wherein $\Delta t_1$ is smaller than about 10 seconds.

In one embodiment, the tapered feature is selected from the group of the maximum cross-sectional dimension of the core region, the cross sectional area of the core region, the maximum cross-sectional dimension of the cladding region, such as a cladding region diameter, the cross sectional area of the cladding region, the maximum cross-sectional outer dimension of the optical fiber, the cross sectional area of the optical fiber, the maximum cross-sectional dimension of elements in a microstructured optical fiber and the pitch of a lattice of elements in a microstructured optical fiber Several features of the optical fiber may change simultaneously in the down- and up-taper sections. For instance, the diameter of a core region and the fiber diameter may be reduced simultaneously, when the optical fiber is tapered down. In some cases, there are features which change independently of one another, such as the fiber diameter may be substantially constant in a down-taper section while the core diameter is reduced. Such a configuration may be realized by e.g. pressuring holes in a fiber preform during the fabrication of the tapered optical fiber.

In the context of the present application, the phrase "the maximum cross-sectional dimension" of a region of the optical fiber, such as the core region, refers to the diameter of a circular cross-section of the region or the diameter of a circle circumscribing a non-circular cross-section of a region. A maximum cross-sectional dimension of a circular shaped core region may thus be a core diameter and a maximum cross-sectional dimension of a circular shaped cladding region may thus be a cladding diameter. In an optical fiber having e.g. an elliptically shaped core region, the maximum cross-sectional dimension of the core region may be the cross sectional extension of the core region along the major axis of the ellipse describing the core region.

In one embodiment, an average gradient of said feature over a major part (i.e. over at least 50% of the length) of said second taper section is larger than the average gradient of said feature over a major part of said first taper section. The down-tapering of said feature in said first taper section may have a first average gradient, $G_1$, and the up-tapering of said feature in said second taper section may have a second average gradient, $G_2$, wherein $G_1 = x \cdot G_2$, where x is smaller than 1, such as smaller than about 0.90, such as smaller than about 0.8, such as smaller than about 0.7, such as smaller than about 0.6, such as smaller than about 0.5, such as smaller than about 0.4, such as smaller than about 0.3, such as smaller than about 0.25, such as smaller than about 0.2, such as smaller than about 0.15, such as smaller than about 0.1, such as smaller than about 0.05, such as smaller than about 0.02, such as smaller than about 0.01, such as smaller than about 0.005, such as smaller than about 0.002, such as smaller than about 0.001, such as smaller than about 0.0005.

In one embodiment $G_1$ and/or $G_2$ for the feature may be smaller than about 150% per meter, such as less than 100% per meter, such as less than 100% per meter, such as less than 75% per meter, such as less than 50% per meter, such as less than 25% per meter, such as less than 10% per meter, such as less than 5% per meter, such as less than 2% per meter, such as less than 1% per meter, such as less than 0.1% per meter. In one embodiment $G_1$ and/or $G_2$ may be larger than 0.1% per meter, such as larger than 1% per meter, such as larger than 2% per meter, such as larger than 5% per meter, such as larger than 10% per meter, such as larger than 25% per meter, such as larger than 50% per meter, such as larger than 75% per meter, such as larger than 100% per meter, such as larger than 150% per meter.

In one embodiment where the feature is measured as a length, such as the maximum cross-sectional dimension of the core or the pitch of a lattice of elements in a microstructured optical fiber, $G_1$ and/or $G_2$ may be smaller than about 300 µm/m, such as smaller than about 200 µm/m, such as smaller than about 150 µm/m, such as smaller than about 100 µm/m, such as smaller than about 50 µm/m, such as smaller than about 20 µm/m, such as smaller than about 15 µm/m, such as smaller than about 12 µm/m, such as smaller than about 10 µm/m, such as smaller than about 8 µm/m, such as smaller than about 6 µm/m, such as smaller than about 4 µm/m, such as smaller than about 2 µm/m, such as smaller than about 1 µm/m, such as smaller than about 0.5 µm/m, such as smaller than about 0.2 µm/m, such as smaller than about 0.1 µm/m, such as smaller than about 0.05 µm/m, such as smaller than about 0.01 µm/m, such as smaller than about 0.001 µm/m.

At the same time the first average gradient, $G_1$ and/or $G_2$ may be larger than about 0.001 µm/m, such as larger than about 0.01 µm/m, such as larger than about 0.1 µm/m, such as larger than about 0.2 µm/m, such as larger than about 0.5 µm/m, such as larger than about 1 µm/m, such as larger than about 1.5 µm/m, such as larger than about 2 µm/m, such as larger than about 5 µm/m, such as larger than about 8 µm/m, such as larger than about 10 µm/m, such as larger than about 12 µm/m, such as larger than about 15 µm/m, such as larger than about 20 µm/m, such as larger than about 30 µm/m, such as larger than about 50 µm/m, such as larger than about 100 µm/m, such as larger than about 150 µm/m, such as larger than about 200 µm/m. Here, the above stated "larger than" and "smaller than" values may be combined to form intervals such as e.g. 1 µm/m<$G_1$<10 µm/m and 0.1 µm/m<$G_2$<5 µm/m. As explained elsewhere in this text, $G_1$ will typically have a relative modest gradient for example to facilitate an efficient coupling between the solitons and the DW, whereas $G_2$ typically has a relative high gradient to provide a short taper to reduce temporal broadening of the generated supercontinuum. Typically, the larger dimensions have a relatively higher gradient compared to smaller features. In one embodiment microstructures in the cladding have gradients $G_1$ and/or $G_2$ smaller than 15 µm/m, such as smaller than about 10 µm/m, such as smaller than about 5 µm/m, such as smaller than about 2 µm/m, such as smaller than about 1 µm/m, such as smaller than about 0.75 µm/m, such as smaller than about 0.5 µm/m, such as smaller than about 0.25 µm/m, such as smaller than about 0.1 µm/m, such as smaller than about 0.01 µm/m. In one embodiment the core diameter have gradients $G_1$ and/or $G_2$ smaller than 50 µm/m, such as smaller than about 25 µm/m, such as smaller than about 10 µm/m, such as smaller than about 5 µm/m, such as smaller than about 2 µm/m, such as smaller than about 1 µm/m, such as smaller than about 0.75 µm/m, such as smaller than about 0.5 µm/m, such as smaller than about 0.25 µm/m, such as smaller than about 0.1 µm/m, such as smaller than about 0.01 µm/m. In one embodiment the cladding diameter have gradients $G_1$ and/or $G_2$ smaller than 300 µm/m, such as smaller than about 200 µm/m, such as smaller than about 150 µm/m, such as smaller than about 100 µm/m, such as smaller than about 50 µm/m, such as smaller than about 25 µm/m, such as smaller than about 10 µm/m, such as smaller than about 5 µm/m, such as smaller than about 2 µm/m, such as smaller than about 1 µm/m. In one embodiment the pitch, i.e. distance between microstructures in the cladding, have gradients $G_1$ and/or $G_2$ smaller than 15 µm/m, such as smaller than about 10 µm/m, such as smaller than about 5 µm/m, such as smaller than about 2 µm/m, such as smaller than about 1 µm/m, such as smaller than about 0.75 µm/m, such as smaller than about 0.5 µm/m, such as smaller than about 0.25 µm/m, such as smaller than about 0.1 µm/m, such as smaller than about 0.01 µm/m. Similar to above, the gradients $G_1$ and/or $G_2$ may also be larger than the cited values above and these values may be combined to form intervals.

In embodiments where the feature is measured as an area, such as the core area or the area of elements forming part of a microstructured optical fiber, $G_1$ and/or $G_2$ may be smaller than about 70000 µm$^2$/m, such as smaller than about 50000 µm$^2$/m, such as smaller than about 20000 µm$^2$/m, such as smaller than about 10000 µm$^2$/m, such as smaller than about 5000 µm$^2$/m, such as smaller than about 1000 µm$^2$/m, such as smaller than about 500 µm$^2$/m, may be smaller than about 400 µm$^2$/m, such as smaller than about 200 µm$^2$/m, such as smaller than about 150 µm$^2$/m, such as smaller than about 125 µm$^2$/m, such as smaller than about 100 µm$^2$/m, such as smaller than about 75 µm$^2$/m, such as smaller than about 50 µm$^2$/m, such as smaller than about 25 µm$^2$/m, such as smaller than about 10 µm$^2$/m, such as smaller than about 5 µm$^2$/m, such as smaller than about 1 µm$^2$/m, such as smaller than about 0.1 µm$^2$/m, such as smaller than about 0.01 µm$^2$/m, such as smaller than about 0.001 µm$^2$/m. Similar to above, the gradients $G_1$ and/or $G_2$ may also be larger than the cited values above and these values may be combined to form intervals.

Typically, the larger dimensions have a relatively higher gradient compared to smaller features. In one embodiment microstructures in the cladding have gradients $G_1$ and/or $G_2$ smaller than 150 µm$^2$/m, such as smaller than about 100 µm$^2$/m, such as smaller than about 50 µm$^2$/m, such as smaller than about 25 µm$^2$/m, such as smaller than about 15 µm$^2$/m, such as smaller than about 10 µm$^2$/m, such as smaller than about 5 µm$^2$/m, such as smaller than about 2, 5 µm$^2$/m, such as smaller than about 1 µm$^2$/m, such as smaller than about 0.5 µm$^2$/m, such as smaller than about 0.1 µm$^2$/m, such as smaller than about 0.01 µm$^2$/m. In one embodiment the core diameter have gradients $G_1$ and/or $G_2$ smaller than 2000 µm$^2$/m, such as smaller than about 1500 µm$^2$/m, such as smaller than about 1000 µm$^2$/m, such as smaller than about 500 µm$^2$/m, such as smaller than about 200 µm$^2$/m, such as smaller than about 100 µm$^2$/m, such as smaller than about 50 µm$^2$/m, such as smaller than about 25 µm$^2$/m, such as smaller than about 15 µm$^2$/m, such as smaller than about 10 µm$^2$/m, such as smaller than about 5 µm$^2$/m, such as smaller than about 2.5 µm$^2$/m, such as smaller than about 1 µm$^2$/m, such as smaller than about 0.5 µm$^2$/m, such as smaller than about 0.1 µm$^2$/m, such as smaller than about 0.01 µm$^2$/m. In one embodiment the cladding diameter have gradients $G_1$ and/or $G_2$ smaller than 70000 µm$^2$/m, such as smaller than about 50000 µm$^2$/m, such as smaller than about 25000 µm$^2$/m, such as smaller than about 10000 µm$^2$/m, such as smaller than about 5000 µm$^2$/m, such as smaller than about 2500 µm$^2$/m, such as smaller than about 1500 µm$^2$/m, such as smaller than about 1000 µm$^2$/m, such as smaller than about 500 µm$^2$/m, such as smaller than about 200 µm$^2$/m, such as smaller than about 100 µm$^2$/m, such as smaller than about 50 µm$^2$/m, such as smaller than about 25 µm$^2$/m, such as smaller than about 15 µm$^2$/m, such as smaller than about 10 µm$^2$/m, such as smaller than about 5 µm$^2$/m, such as smaller than about 2.5 µm$^2$/m, such as smaller than about 1 µm$^2$/m, such as smaller than about 0.5 µm$^2$/m, such as smaller than about 0.1 µm$^2$/m, such as smaller than about 0.01 µm$^2$/m. Similar to above, the gradients $G_1$ and/or $G_2$ may also be larger than the cited values above and these values may be combined to form intervals. The feature may change along at least a part of said waist section. The average gradient of the change in the feature in the waist section may be smaller than the average gradient of the change in the feature in the first taper section, such as at least about 1.5 times smaller than the gradient in the first taper section, such as at least about 2 times smaller, such as at least about 3 times smaller such as at least about 5 times smaller such as at least about 7 times smaller such as at least about 10 times smaller such as at least about 15 times smaller such as at least about 20 times smaller such as at least about 50 times smaller, such as at least about 100 times smaller.

In one embodiment, the first taper section and/or the second taper section have a substantially constant gradient along the major part of the taper sections, such as along at least about 50% of the taper sections, such as along at least about 60%, such as along at least about 70%, such as along at least about 80%, such as along at least about 90%, such as along at least about 95%, such as substantially along the entire length of the taper sections.

In one embodiment, the gradient of a feature changes along the first and/or second taper sections. A change in the gradient of e.g. the core area in the first taper section may be such that the gradient is larger near the first longitudinal position than near the waist section. The opposite may also be the case such that the gradient is larger near the taper waist than near the first longitudinal position. The gradient may also be largest in a central part of the first taper section. A change in the gradient of e.g. the core area in the second taper section may be such that the gradient is larger near the second longitudinal position than near the waist section. The opposite may also be the case such that the gradient is larger near the taper waist than near the second longitudinal position. The gradient may also be largest in a central part of the second taper section.

The value of a given feature of said optical fiber along the first taper section may be described by a function f. such that the function has a first value $f_1$ at the first longitudinal position of the taper, a waist value $f_w$ at the taper waist, and an average value, $f_a$, defined by $f_a=(f_1+f_w)/2$. The position at which the function has this average value may be referred to as the average position.

When the gradient of a feature in said first taper section is such that the gradient is larger near the taper waist than near the first longitudinal position, the average position at which the function has its average value $f_a$ may be located closer to the waist section than the first longitudinal position. The average position may be located such that the ratio between its distance to the taper waist and its distance to the first longitudinal position is smaller than about 0.95, such as smaller than about 0.9, such as smaller than about 0.85, such as smaller than about 0.8, such as smaller than about 0.7, such as smaller than about 0.6, such as smaller than about 0.5, such as smaller than about 0.4, such as smaller than about 0.3, such as smaller than about 0.2, such as smaller than about 0.1.

When the gradient of a feature in said first taper section is such that the gradient of a feature is larger near the taper waist than near the first longitudinal position, the gradient may gradually increase along at least a portion of said first taper section arranged between two positions, a and b, providing a concave shape of this portion of the first taper section.

The concavity of a concave portion of said first taper section may be such that for any t in [0, 1] and for any two points x and y in a portion of the first taper section arranged between the positions a and b, a function f relating a feature of said optical fiber may obey the equation:

$$f(tx+(1-t)y) \geq tf(x)+(1-t)f(y)$$

Compared to a linear taper wherein the gradient of the feature is substantially constant along the first taper section, the equation provided above states that for every position z along the portion of the first taper section located between x and y, the point (z, f(z)) on the graph of f is above the straight line joining the points (x, f(x)) and (y, f(y)) of a linear taper.

In FIG. 6 is illustrated the relation between the curve f and a straight line the latter corresponding to a linear taper with a constant gradient.

The change in the gradient may level out when approaching the waist in order to provide a smooth transition without an abrupt change from a section in which the gradient is increasing to a section wherein the gradient is substantially zero. According to the theory below, one can find the blue-edge wavelength by group-velocity matching to a certain red edge. This red edge is the lowest of two wavelengths: 1) The long-wavelength loss edge of the fiber material, such as 2200-2400 nm for silica, and 2) the second long-wavelength zero-dispersion wavelength of the fiber minus about 50 nm. These characteristic wavelengths are depicted versus pitch in FIG. 19 (see also FIG. 18). The blue-edge wavelength then typically has a minimum around a given pitch, which is often relatively flat. The flatness means that even though the optimum pitch with the lowest blue-edge wavelength is say 2.0 microns, then a pitch of say 2.4 microns would give a blue-edge fairly close to the minimum. This means that a concave taper could be advantageous, in that is has the lowest possible group acceleration mismatch (GAM) at the taper entrance. It's GAM will then increase down the taper, which means that the power in the DW will decrease. However, if the pitch at which the DW is starting to lose too much power is sufficiently close to the optimum, then the above mentioned flatness will mean that this will happen close to the minimum achievable blue-edge.

One theoretical framework for describing the underlying physics of SCG in the tapered optical fiber is valid for combinations of pump source and fiber, for which the spectral edges are primarily determined by a soliton red-edge linked to a dispersive wave (DW) blue-edge through group-velocity (GV) matching at some point between the input to the fiber and the taper waist. This is typically the case when the fiber is pumped with light at a wavelength in anomalous region i.e. above the zero dispersion wavelength (ZDW) or below the anomalous region but relatively close to the ZDW such that either some of the spectral width of the pump light is above the ZDW and/or high amounts of pump light red shifts above the ZDW e.g. by self-phase modulation. This could for example be less than 150 nm below the ZDW, such as less than 100 nm below the ZDW, such as less than 50 nm below the ZDW, such as less than 25 nm below the ZDW, such as less than 10 nm below the ZDW, such as less than 1 nm below the ZDW. In one embodiment the fiber is pumped in the normal regime below the ZDW and the ZDW is shifted to shorter wavelengths to bring the ZDW closer to the pump wavelength pump wavelength or even into the anomalous regime. One advantage may be that fibers with a long ZDW typically have a larger core, facilitating easier coupling to the fiber. In one embodiment this shift in ZDW is provided by a taper prior to the first longitudinal position for example with a gradient different from that of the first taper section. In one embodiment a very short taper is employed after which fiber is un-tapered until the first longitudinal position. In one embodiment this effectively corresponds to improving coupling to a fiber with a lower initial ZDW. In one embodiment the shift in ZDW is performed after the first longitudinal position for example by having a fairly low gradient in the initial part of the down taper. In the case of a supercontinuum light source comprising a fiber according to the invention for generating the output light, the difference between the centre wavelength of a pump source and the zero dispersion wavelength of the fundamental core mode at said first longitudinal position and/or at said waist and/or at said input end may be less than about 200 nm, such as less than about 100 nm, such as less than about 50 nm, such as less than about 25 nm, such as less than about 15 nm, such as less than about 10 nm, such as less than about 5 nm, such as less than about 2 nm, such as less than about 1 nm. In one embodiment the zero dispersion wavelength is the shorter of the two. In one embodiment the zero dispersion wavelength is the longer of the two. In this theoretical framework, the edges are formed when a red-shifting soliton and a DW catches up with each other, allowing them to collide and interact through cross-phase modulation (XPM). The collision requires a decelerating soliton, because the DW exists at short wavelengths where the Group-Velocity (GV) profile is steeper than around the soliton wavelength, which means that the collision will push the DW to a lower GV than the soliton. The deceleration may come from intra-pulse Raman scattering, which red-shifts the soliton towards lower GV. It can likewise be achieved by tapering the fiber, in which case a change in the GV may cause a deceleration of the soliton. The decelerating soliton eventually collides with the DW and they interact through XPM. Part of the DW is thereby pushed further down in the blue. The fact that only a certain part of the DW is blue-shifted is due to the GV mismatch (GVM) between the soliton and the DW when they collide. The remaining part of the DW is left behind and contributes to the supercontinuum at longer wavelengths than the blue edge.

The inventors have realized that the gradient of the feature of the optical fiber in the first taper section has a high impact on the power available in the blue-edge, and that the group acceleration mismatch (GAM) defined is suitable for quantifying the impact.

In the taper, the GVs of the soliton and the DW change at different rates. Thus, even if they were GV matched before the taper, then the taper will force a GVM which again means that the soliton can only trap and blue-shift a fraction of the DW. The GVM imposed by a taper on a soliton and DW initially GV matched at the entrance of the taper is illustrated in FIG. 7. The optical fiber in FIG. 7 is chosen to be a microstructured optical fiber with air holes as elements. The air holes being arranged in a triangular lattice with pitch $\Lambda=3.7$ μm at the entrance of the tapered section (longitudinal direction z=z0) and pitch $\Lambda=1.8$ a distance $\Delta z$ into the taper. In FIG. 7, the taper is linear with a constant gradient and fixed hole diameter to pitch ratio. The considerations are however valid for any feature describing a parameter which changes in response to the tapering of the optical fiber in the taper section. The group acceleration (GA) for the soliton may be defined as the derivative of the soliton GV with respect to the position (z). along the longitudinal axis of the optical fiber:

$$GA_{sol} = \frac{\partial GV_{sol}}{\partial z}\bigg|_{\lambda=\lambda_{sol}}$$

and similarly for the DW. In this expression, the wavelength is assumed to be constant, which may only be true over short distances. The group acceleration mismatch (GAM) of the DW and soliton may be approximated by:

$$GAM \approx \frac{GV_{DW}(z_0 + \Delta z) - GV_{sol}(z_0 + \Delta z)}{\Delta z}$$

The GAM parameter can be calculated as indicated in FIG. 7, where it is seen that GAM depends on the soliton wavelength and the gradient in the first taper section. The DW wavelength is fixed by GVM. FIG. 8 shows how the GAM increases with the gradient (in FIG. 7, the phrase "steepness" is used instead of "gradient") and soliton wavelength for $\Delta z=10$ mm.

For long wavelengths and very steep tapers, the proximity of the long wavelength zero-dispersion wavelength (ZDW) decreases the GAM.

The interaction between the soliton and DW may hence depend on the taper profile. Simulations were performed to determine the energy in the most blue-shifted trapped DW for the taper profiles illustrated FIG. 9a. These taper profiles have the same total length but varying gradient in the first taper section. FIG. 9b shows the calculated energies normalized to the energy at the waist in the taper having the highest gradient in the first taper section. The dashed and full lines show the values at the taper waist and fiber end, respectively. The graphs of FIG. 9 confirm that the energy of the most blue-shifted trapped DW decreases with increasing gradient of the first taper section. In the present case, the blue-shifted energy is increased almost by a factor of 15 when the gradient is reduced to a sixth. These two graphs indicate that for blue SC generation, the optimum profile for a taper of a given length is the one that minimizes the GAM, i.e., the gradient of the first taper section should preferably be minimized.

The conclusion reached by using this model relies on two assumptions: (1) the soliton and DW are GV matched when entering the taper, (2) the soliton does not get near the long-wavelength ZDW or loss-edge of the fiber material. The second assumption may effectively enforce an upper limit on the length of the first taper section. The model predicts that when the gradient of the first taper section is lowered the soliton is able to keep more of the energy from the DW trapped and more energy is found at the blue edge of the supercontinuum spectrum. The model indicates that the trapped DW also is blue-shifted a little after the taper waist where the GVM with the soliton is broken. This may be due to the tail of the soliton giving the DW a small blue-shift in the very beginning of the up-tapering, before the GVM is broken entirely.

While not essential to the validity of the present invention, and while not limiting the scope of the invention in any manner, the model presented above has proven useful in providing a theoretical framework wherein the results can be explained. The model is hence considered to define embodiments of the invention.

Based on the theoretical understanding laid out above important embodiments of the fiber for supercontinuum applications are found by balancing the lengths $L_0$, $L_1$, and the gradient profile of the feature relative to parameters of the fiber (such as the dispersion profile) and the pulse properties of the pump source. According to the theoretical frame work the first taper section, $L_1$, is used to shift the blue edge towards shorter wavelengths by utilizing the changing group-velocity profile and the continuous blue-shift of DWs by group-velocity matched solitons along the taper. The section before the taper is then designed to receive the pump light. It may further be used to generate the solitons pulse from the pump pulse, commonly via modulation instability, as well as cause part of the red-shifting of the solitons and thereby generate part of the supercontinuum. In one embodiment the length $L_0$ is chosen long enough to generate a significant part of the solitons and DWs to be manipulated by the taper. In one embodiment the length $L_0$ is short or even zero whereby the initial generation is performed in the first taper section. As explained above the pump pulse duration is often important for the length of the taper and it is also expected that the optimum length of $L_0$ is depending on the pump pulse length according to the soliton number N, given by $N^2=\gamma P_0 T_0^2/|\beta_2|$, where $\gamma$ is the nonlinearity parameter, $P_0$ is the pump peak power, $T_0$ is the pump pulse length, and $\beta_2$ is the group-velocity dispersion. The higher the soliton number the more efficient the SCG process and the shorter a length of $L_0$ and/or $L_1$ is needed. Often the length of $L_0$ will be non-zero to allow a faulty splicing to be corrected without having to sacrifice a length of the first taper section. The length of the taper waist is in one embodiment preferable short in order to use all available length to minimize the down-taper gradient $G_1$ and in order to avoid too many solitons redshifting into the loss edge. In one embodiment $L_2$ and $L_3$ will be as short as possible to minimize loss and temporal pulse dispersion.

Based on the above the length of $L_0$ is in one embodiment less than 150 m, such as less than 100 m, such as less than 50 m, such as less than 30 m, such as less than 20 m, such as less than 10 m, such as less than 5 m, such as less than 2 m, such as less than 1 m, such as less than 0.75 m, such as less than 0.5 m, such as less than 0.3 m, such as less than 0.1 m. $L_2$ is in one embodiment less than 50 m, such as less than 30 m, such as less than 20 m, such as less than 10 m, such as less than 5 m, such as less than 2 m, such as less than 1 m, such as less than 0.75 m, such as less than 0.5 m, such as less than 0.3 m, such as less than 0.1 m. $L_3$ is in one embodiment less than 50 m, such as less than 30 m, such as less than 20 m, such as less than 10 m, such as less than 5 m, such as less than 2 m, such as less than 1 m, such as less than 0.75 m, such as less than 0.5 m, such as less than 0.3 m, such as less than 0.1 m.

In one embodiment $L_1$ is less than less than 150 m, such as less than 100 m, such as less than 50 m, such as less than 30 m, such as less than 20 m, such as less than 10 m, such as less than 5 m, such as less than 2 m, such as less than 1 m, such as less than 0.75 m, such as less than 0.5 m, such as less than 0.3 m. However as discussed above, a relatively low gradient may be preferable to obtain an efficient coupling between the solitons and the DW. Accordingly, $L_1$ is in one embodiment longer than 0.3 m, such as longer than 0.75 m, such as longer than 1 m, such as longer than 1.5 m, such as longer than longer than 2 m, such as longer than 3 m, such as longer than 4 m, such as longer than 5 m, such as longer than 6 m, such as longer than 7 m, such as longer than 8 m, such as longer than 9 m, such as longer than 10 m, such as longer than 13 m, such as longer than 15 m, such as longer than 17 m, such as longer than 20 m. Here the above values for than for "shorter" and "longer" than are in one embodiment intended to be combinable to form intervals.

In one embodiment the above cited values for $L_1$ and $L_2$ are combinable with the gradients cited above.

In embodiments, where the lengths of the first and second taper sections differ, the difference in lengths may be expressed through the equation $L_2 = y \cdot L_1$, where y is smaller than 1, such as smaller than about 0.9, such as smaller than about 0.8, such as smaller than about 0.7, such as smaller than about 0.6, such as smaller than about 0.5, such as smaller than about 0.4, such as smaller than about 0.3, such as smaller than about 0.25, such as smaller than about 0.2, such as smaller than about 0.15, such as smaller than about 0.1, such as smaller than about 0.05, such as smaller than about 0.04, such as smaller than about 0.03, such as smaller than about 0.02, such as smaller than about 0.01, such as smaller than about 0.005, such as smaller than about 0.002, such as smaller than about 0.001, such as smaller than about 0.0005.

The second taper section may provide up tapering to a dimension such that the fiber may relatively easily coupled to e.g. other optical fiber or fiber components.

One advantage of having a different length of the first and second taper sections may be that when a pump light signal arranged to generate broad band light propagates through a tapered section where e.g. the core diameter is reduced, the generation of light at shorter wavelengths, such as wavelengths in the blue part of the electromagnetic spectrum, may be more efficient when the core diameter is reduced over relatively long down tapering, such as over several meters. However, the inventors have realized that a relatively long up-tapering to the original core diameter in a second tapering section may result in, e.g., chromatic dispersion related temporal broadening of the spectrally broad signal generated in e.g. the first taper section. The inventors have further invented a method and an apparatus for realizing optical fibers with a long down tapered section followed by a significantly shorter up tapered section.

The apparatus may provide the advantage of a directly coating of the tapered fiber compared to prior art tapers where the optical fiber is first stripped its coating and then tapered in a taper station before being recoated. The apparatus and method of this invention perform the tapering directly during production of the fiber thereby eliminating the need for post-processing steps such as stripping and recoating which is necessary in some prior arts methods of manufacturing fiber tapers on a so-called tapering station.

The core region may be a single material core, such as a silica core, which is surrounded by a cladding region with a different effective refractive index.

In one embodiment, the core region is tapered down over said first taper section from a first core area, $A_1$, at said first longitudinal position to a waist core area, $A_w$, at said taper waist, and said core region is tapered up over said second taper section to a second core area, $A_2$, at said second longitudinal position. The waist core area may be the smallest cross sectional core area found along the taper section.

In a microstructured optical fiber, the core area may be defined as the area of a circle inscribed by the elements of the fiber arranged to immediately surround the core.

In one embodiment, the optical fiber comprises an input end and an output end. The core region may have an input core area, $A_{in}$, at the input end and an output core area, $A_{out}$, at the output end.

In one embodiment, $A_{in}$ is substantially identical to $A_{out}$.

In one embodiment, $A_{in}$ is larger than $A_{out}$.

In one embodiment, $A_{in}$ is smaller than $A_{out}$.

The outer diameter of the optical fiber at said input end may be substantially equal to the outer diameter of said optical fiber at said output end.

In the context of the present invention, the phrase "outer diameter" of the optical fiber refer to maximum cross-sectional dimension of the outermost cladding not including any protective coating unless otherwise clear. The phrase "cladding diameter" may also be used in some cases when referring to this diameter.

The optical fiber may comprise an input section arranged between said input end and said tapered section and/or an output section arranged between said tapered section and said output end.

In one embodiment, a section of optical fiber is arranged between the input end and the first longitudinal position. The length of this section may be more than about 0.01 mm, such as more than 0.1 mm, such as more than 0.5 mm, such as more than 1 mm, such as more than 5 mm, such as more than 10 mm, such as more than 20 mm, such as more than 50 mm, such as more than 100 mm.

In one embodiment, a section of optical fiber is arranged between the second longitudinal position and the output end. The length of this section may be more than about 0.01 mm, such as more than 0.1 mm, such as more than 0.5 mm, such as more than 1 mm, such as more than 5 mm, such as more than 10 mm, such as more than 20 mm, such as more than 50 mm, such as more than 100 mm.

These input and output sections may each comprise sections with a substantially constant value of said feature and/or sections wherein the optical fiber e.g. has a pre-taper arranged before the first tapered section and/or a post-taper section arranged after said second taper section, in which pre- and post-taper sections the value of said feature may change.

The optical fiber may consist of the tapered section, i.e. the tapered section may extend from the input and to the output end of the optical fiber.

In one embodiment, the cladding region is tapered down from a first cladding area, $A_{cl,1}$, to a waist cladding area, $A_{cl,W}$, over said first length and/or the cladding region is tapered up to a second cladding area, $A_{cl,2}$, over said second length.

The down-tapering and the up-tapering may be such that the value of said features is substantially the same on both sides of the tapered section. In one embodiment, the first core area is substantially equal to said second core area. In one embodiment, the first cladding area is substantially equal to said second cladding area. In one embodiment substantial equal is to within less than 30%, such as within less then 20%, such as within less then 10%, such as within less then 5%, such as within less then 1%.

The taper waist may be substantially localized at a single point along the longitudinal direction of the optical fiber. Such a localized taper waist may be obtained when the first and second taper sections are arranged substantially in direct continuation of each other.

The taper waist may be comprised in a waist section, which extends along the longitudinal axis of the tapered optical fiber over a waist length, $L_W$, the waist section being arranged between the first taper section and the second taper section. The feature may have the minimum value or a value substantially equal to this value over major part of said waist section, such that variations in the value of the feature over the major part of said waist section may be less than about 25% of the minimum value of said feature in said taper waist, such as less than about 15%, such as less than about 10%, such as less than about 8%, such as less than about 5%, such as less than about 2%, such as less than about 1%, such as said feature being constant along said major part of the waist section length. The major part may be at least about 50%, such as at least about 60%, such as at least about 70%, such as at least about 80%, such as at least about 90%, such as at least about 95%, such a 100% of the waist section. Such a waist section may be referred to as a uniform waist section.

In one embodiment, the waist is substantially a single point in the tapered structure, such as when the taper length is comparable to the outer diameter of the optical fiber in the waist. The length of the waist may be less than about 1 mm, such as less than about 0.5 mm, such as less than about 0.2 mm, such as less than about 0.1 mm.

In one embodiment, the waist length, $L_W$, is more than about 0.001 m, such as more than 0.01 m, such as more than 0.1 m, such as more than about 0.2 m, more than about 0.3 m, such as more than about 0.5 m, such as more than about 1 m, such as more than about 2 m, such as more than about 5 m, such as more than about 10 m, such as more than about 20 m, such as more than about 35 m, such as more than about 50 m, such as more than about 100 m, such as more than about 200 m. The waist length may be below about 10 km, such as below about 5 km, such as below about 1 km.

For many applications of the optical fiber according to the present invention the optical fiber is a non-linear fiber. Such fibers are known to exhibit relative large non-linear effects useful e.g. in SCG in broad band sources, such as white light sources.

In one embodiment, a nonlinear coefficient of the core region at said input end is more than about 0.5 $W^{-1}km^{-1}$ for a signal at a wavelength of 1064 nanometers, such as more than about 1 $W^{-1}km^{-1}$, such as more than about 2 $W^{-1}km^{-1}$, such as more than about 5 $W^{-1}km^{-1}$, such as more than about 8 $W^{-1}km^{-1}$, such as more than about 10 $W^{-1}km^{-1}$, such as more than about 12 $W^{-1}km^{-1}$, such as more than about 15 $W^{-1}km^{-1}$, such as more than about 20 $W^{-1}km^{-1}$, such as more than about 25 $W^{-1}km^{-1}$, such as more than about 50 $W^{-1}km^{-1}$ such as more than about 75 $W^{-1}km^{-1}$ such as more than about 100 $W^{-1}km^{-1}$ such as more than about 150 $W^{-1}km^{-1}$ such as more than about 200 $W^{-1}km^{-1}$ such as more than about 250 $W^{-1}km^{-1}$ such as more than about 400 $W^{-1}km^{-1}$. In one embodiment the nonlinear coefficient of the core region at said input end is less than about 400 $W^{-1}km^{-1}$ for a signal at a wavelength of 1064 nanometers, such as less than about 250 $W^{-1}km^{-1}$, such as less than about 150 $W^{-1}km^{-1}$, such as less than about 100 $W^{-1}km^{-1}$, such as less than about 50 $W^{-1}km^{-1}$, such as less than about 25 $W^{-1}km^{-1}$, such as less than about 10 $W^{-1}km^{-1}$, such as less than about 5 $W^{-1}km^{-1}$, such as less than about 1 $W^{-1}km^{-1}$. The "less than" and "more than" values cited above being combinable to form intervals.

In one embodiment, a nonlinear coefficient of the core region at said taper waist is more than about 0.5 $W^{-1}km^{-1}$ for a signal at a wavelength of 1064 nanometers, more than about 1 $W^{-1}km^{-1}$, such as more than about 2 $W^{-1}km^{-1}$, such as more than about 5 $W^{-1}km^{-1}$, such as more than about 8 $W^{-1}km^{-1}$, such as more than about 10 $W^{-1}km^{-1}$, such as more than about 12 $W^{-1}km^{-1}$, such as more than about 15 $W^{-1}km^{-1}$, such as more than about 20 $W^{-1}km^{-1}$, such as more than about 25 $W^{-1}km^{-1}$, such as more than about 50 $W^{-1}km^{-1}$ such as more than about 75 $W^{-1}km^{-1}$ such as more than about 100 $W^{-1}km^{-1}$ such as more than about 150 $W^{-1}km^{-1}$ such as more than about 200 $W^{-1}km^{-1}$ such as more than about 250 $W^{-1}km^{-1}$ such as more than about 400 $W^{-1}km^{-1}$. In one embodiment the nonlinear coefficient of the core region at said taper waist is less than about 400 $W^{-1}km^{-1}$ for a signal at a wavelength of 1064 nanometers, such as less than about 250 $W^{-1}km^{-1}$, such as less than about 150 $W^{-1}km^{-1}$, such as less than about 100 $W^{-1}km^{-1}$, such as less than about 50 $W^{-1}km^{-1}$, such as less than about 25 $W^{-1}km^{-1}$, such as less than about 10 $W^{-1}km^{-1}$, such as less than about 5 $W^{-1}km^{-1}$, such as less than about 1 $W^{-1}km^{-1}$. The "less than" and "more than" values cited above being combinable to form intervals.

In one embodiment it is advantageous to have a relatively low non-linearity at the input, commonly linked to a large core facilitating easy coupling to the fiber, and a large non-linearity at the taper waist to enhance non-linear properties. In one embodiment, the optical fiber is a microstructured optical fiber comprising a microstructure at least along a part of its length, said microstructure comprising a plurality of microstructure elements. The microstructure may at least partially be maintained along at least a part of said first taper section and/or along at least a part of said second taper section and/or along at least a part of said waist section.

The microstructure may comprise different types of microstructure elements, such as elements comprising a material with a refractive index different from the refractive index of the background material, in which the elements are embedded. The microstructure elements may comprise air holes and/or material that is up-doped and/or down-doped relative to the background material, such as a silica material doped with index changing materials such as F, Ge, P, B, or combinations of thereof.

The refractive index profile of the optical fiber may be such that the core region guides light at least in part due to said microstructure. The microstructure may be arranged in the cladding region to provide an index difference between the core region and the microstructured part of the cladding, said index difference being at least about $1\cdot10^{-3}$, such as at least about $2\cdot10^{-3}$, such as at least about $5\cdot10^{-3}$, such as at least about $1\cdot10^{-2}$, such as at least about $2\cdot10^{-2}$, such as at least about $5\cdot10^{-2}$, such as at least about $1\cdot10^{-1}$.

The microstructure elements may comprise a plurality of a first type of element having a first maximum cross-sectional dimension, such as first element diameter, $d_f$, said first type of elements being arranged in a substantially periodic lattice with a pitch of $\Lambda$ defined as the center to center distance between two neighboring elements equals $\Lambda$.

In one embodiment the first taper section and/or the second taper section and/or the waist section is arranged such that the ratio between said first element diameter and said pitch, $d_f/\Lambda$, is substantially constant along the first taper section and/or the second taper section and/or the waist section.

For applications, wherein a strong confinement is advantageous, the relative size of the air holes may be relatively large, such that the ratio $d_f/\Lambda$ is large, while in some cases a lower ratio may be preferred to e.g. provide single mode operation in an optical fiber with a large mode area. Depending on the application, the ratio $d_f/\Lambda$ may at least along a part of said optical fiber be in the range from about 0.3 to about 0.95, such as in the range from about 0.4 to about 0.9, such as in the range from about 0.5 to about 0.8. In one embodiment the fiber is single mode at all wave lengths because $d_f/\Lambda$ is less than about 0.42. In one embodiment the fiber is preferably single mode at the pump wavelength, which at a common pump wavelength of 1064 nm means that $d_f/\Lambda$ is less than about 0.52. In one embodiment these values are at least at the input end for example to control whether pump light can couple to higher order modes, which could be desirable or not, depending on the application. For example higher order modes may experience another dispersion profile and/or ZDW and thereby contribute to the supercontinuum generation in another way than light in the fundamental mode. On the other hand it may in some applications be undesirable that the generated supercontinuum is multi mode. In one embodiment the above cited values for $d_f/\Lambda$ are at least at the output end for example to match to a subsequent fiber and/or to filter mode content of the output light.

Further a relative large size of low index elements, such as air holes, may reduce the wavelength of the blue edge of a supercontinuum spectrum, through the group velocity matching.

The down-tapering in said first taper section may reduce said pitch, such that the ratio between the pitch in said waist section and the pitch at said first longitudinal position is below about 0.9, such as below about 0.8, such as below about 0.7, such as below about 0.6, such as below about 0.5, such as below about 0.4, such as below about 0.3, such as below about 0.2, such as below about 0.1.

In one embodiment, the ratio between the waist core area and the first core area is in the range of about 0.05 to about 0.8, such as in the range of about 0.1 to about 0.7, such as in the range of about 0.15 to about 0.6, such as in the range of about 0.2 to about 0.5, such as in the range of about 0.25 to about 0.4.

The lengths of the different sections of the optical fiber may be such that the length of said waist section, $L_W$, is smaller than the length of said first taper section, $L_1$. The length of said waist section, $L_W$, may be larger than, smaller than or substantially equal to the length of said second taper section, $L_2$.

In one embodiment, the waist core area is smaller than about 20 $\mu m^2$, such as smaller than about 15 $\mu m^2$, such as smaller than about 12 $\mu m^2$, such as smaller than about 10 $\mu m^2$, such as smaller than about 8 $\mu m^2$, such as smaller than about 6 $\mu m^2$, such as smaller than about 5 $\mu m^2$, such as smaller than about 4 $\mu m^2$, such as smaller than about 3 $\mu m^2$, such as smaller than about 2 $\mu m^2$, such as smaller than about 1 $\mu m^2$.

The core region may support a fundamental core mode, which at said first longitudinal position and/or at said waist and/or at said input end may have a zero dispersion wavelength, $\lambda_{ZDW}$, in the range of about 300 nm to about 3000 nm, such as in the range of about 300 nm to about 2600 nm, such as in the range of about 300 nm to about 2200 nm, such as in the range of about 450 nm to about 1800 nm, such as in the range of about 600 nm to about 1600 nm.

In one embodiment the zero dispersion wavelength is reduced in the first taper section and/or increased in said second taper section.

For light guided at a first wavelength $\lambda_1$ the fundamental core mode may have a mode field full-width-half-maximum diameter at said first longitudinal position and/or at said waist and/or at said input end that is smaller than about 20 $\mu m$, such as smaller than about 10 $\mu m$, such as smaller than about 8 $\mu m$, such as smaller than about 6 $\mu m$, such as smaller than about 5 $\mu m$, such as smaller than about 4 $\mu m$, such as smaller than about 3 $\mu m$, such as smaller than about 2 $\mu m$, such as smaller than about 1 $\mu m$.

In one embodiment, the first length is larger than about 1 m, such as larger than about 3 m, such as larger than about 5 m, such as larger than about 8 m, such as larger than about 10 m, such as larger than about 15 m, such as larger than about 20 m, such as larger than about 30 m, such as larger than about 50 m, such as larger than about 75 m, such as larger than about 100 m, such as larger than about 150 m, such as larger than about 200 m.

In one embodiment, the second length is below about 10 m, such as below about 8 m, such as below about 5 m, such as below about 4 m, such as below about 3 m, such as below about 2 m, such as below about 1.5 m, such as below about 1 m, such as below about 0.8 m, such as below about 0.6 m, such as below about 0.4 m, such as below about 0.2 m, such as below about 0.1 m.

In one embodiment, the sum of the lengths of the first and second taper sections, $L_1+L_2$, is larger than about 1 m, such as larger than about 2 m, such as larger than about 3 m, such as larger than about 4 m, such as larger than about 5 m, such as larger than about 6 m, such as larger than about 7 m, such as larger than about 8 m, such as larger than about 9 m, such as larger than about 10 m, such as larger than about 15 m, such as larger than about 20 m, such as larger than about 30 m, such as larger than about 50 m, such as larger than about 75 m, such as larger than about 100 m, such as larger than about 150 m, such as larger than about 200 m. In one embodiment the sum of said first length and said second length, $L_2+L_1$, is less than about 200 m, such as less than about 150 m, such as less than about 100 m, such as less than about 50 m, such as less than about 30 m, such as less than about 15 m, such as less than about 10 m, such as less than about 9 m, such as less than about 8 m, such as less than about 7 m, such as less than about 6 m, such as less than about 5 m, such as less than about 4 m, such as less than about 3 m, such as less than about 2 m, such as less than about 1.5 m, such as less than about 1 m. Here any combination of ranges is in principle possible, such as lengths between 1.5 m and 25 m. This sum may be limited by the entire length of optical fiber that can be drawn from said fiber preform. Also, it is often desirable to limit the length of the fiber to reduce cost as well as limit the loss the fiber imposes on the light generated in the fiber. It is therefore often optimal to limit the fiber length to the length after which further travelling of the light down the fiber does not substantially broaden the spectrum plus any tapering required allowing the fiber to be coupled to subsequent optics, such as fiber optics. The inventors expect that the necessary fiber length increases with the use of longer pump pulses. The sum of $L_1+L_2$ is therefore expected to be optimum in the range of 1 m to 20 m for pump pulse in the few ps regime, such as between 1 m to 15 m, such as on the range of 1 m to 10 m, such as in the range of 3 m to 10 m, such as in the range of 5 m to 10 m, such as in the range of 5 m to 8 m. In one embodiment a few ps range is understood as from 0.5 ps to 750 ps, such as 0.6 ps to 500 ps, such as 0.7 ps to 300 ps, such as 0.8 ps to 100 ps, such as 0.9 ps to 50 ps, such as 1 ps to 25 ps. However, such lengths may in one embodiment be sufficient for longer pulses, such as 0.5 ns to 1000 ns, such as 0.5 ns to 750 ns, such as 0.6 ps to 500 ps, such as 0.7 ps to 300 ps, such as 0.8 ps to 100 ps, such as 0.9 ps to 50 ps, such as 1 ps to 25 ps. For micro second pulse and CW optimum lengths of $L_1+L_2$ are expected to be in the order of 1 m or more, such as 10 m or more, such as 30 m or more, such as 50 m or more, such as 75 m or more, such as 100 m or more, such as 200 m or more. In one embodiment, the sum of the lengths of the first and second taper sections, $L_1+L_2$ may be below about 10 km, such as below about 5 km, such as below about 1 km, such as below 500 m, such as below 300 m, such as below 200 m, such as below 100 m.

The inventive concept of the present invention is not limited to any specific fiber material. The tapered optical fiber may hence comprise a material selected from the group of silica glass, chalcogenide glass, soft glasses, polymer material and any other material suitable for the production of optical fibers.

The first wavelength may be in the range of about 400 nm to about 1600 nm, such as in the range of about 600 nm to about 1400 nm, such as in the range of about 800 nm to about 1200 nm, such as in the range of about 900 nm to about 1100 nm.

In one embodiment, the first core area is substantially identical to said input core area. In one embodiment, the second core area is substantially identical to said output core area.

The pump source is arranged to emit cw or quasi-cw light or light pulses in the second range, the millisecond range, the microsecond range, the nano-second range, or in the pico-second range. Given the short tower tapers made available by this technique the fibers according to the invention may also be appropriate for fs range. The energy of each pump pulse may be coupled into the core of the tapered optical fiber on a time scale that is shorter than about 1 s, such as shorter than about 100 ms, such as shorter than about 50 ms, such as shorter than about 10 ms, such as shorter than about 1 ms, such as shorter than about 100 ps, such as shorter than about 50 μs, such as shorter than about 10 μs, such as shorter than about 1 μs, such as shorter than about 100 ns, such as shorter than about 10 ns, such as shorter than 1 ns, such as shorter than 750 ps, such as shorter than 500 ps, such as shorter than 250 ps, such as shorter than 100 ps, such as shorter than 50 ps, such as shorter than 25 ps, such as shorter than 10 ps, such as shorter than 5 ps, such as shorter than 3 ps, such as shorter than 1 ps. In the context of the present invention the pulse duration considered is the full-width-half-maximum duration. Some pump systems suitable for launching pulses into an optical fiber with a relative long duration of each pulse are described in PCT-DK2010-050224.

In one embodiment, the core region is substantially single mode along the entire length of the optical fiber for light propagating at said first wavelength and/or at said centre wavelength.

The shorter time interval in which the line speed of the drawing tower is increased may be less than about 5 seconds, such as less than about 3 seconds, such as less than about 2 seconds, such as less than about 1 second, such as less than about 0.5 second, such as less than about 0.2 second, such as less than about 0.1 second.

The change in the line speed caused by said acceleration or said deceleration may be such that first line speed differs by more than about 20% from said second line speed, such as by more than about 30%, such as by more than about 50%, such as by more than about 60%, such as by more than about 75%, such as by more than about 100%, such as by more than about 150%, such as by more than about 200%, such as by more than about 300%, such as by more than about 400%.

Several features of the optical fiber may be changed in the taper section, such as the fiber diameter, the core area, and the pitch of a micro structured cladding comprising e.g. air holes or solid rods. The value of the features may to a large extent be controlled by the capstan unit through the pulling force it applies to the first end of the fiber preform. The pulling force results in the drawing of the optical fiber at a line speed where conservation of mass determines the cross sectional dimensions of the drawn optical fiber. The feeding velocity at least partly determines the volume of preform material that is supplied, i.e. the volume of material that is made available for the drawing of the optical fiber, while the line speed at least partly determines the length of the optical fiber drawn from the supplied volume of preform material. Together the feeding velocity and the line speed hence determines the cross sectional dimensions of the features of the optical fiber, and changes in these two may lead to changes in the cross sectional dimensions. For a substantially constant feeding velocity, an increase in the line speed may result in a reduction of the cross sectional dimensions of the optical fiber, while an increase in the cross sectional dimensions of the optical fiber may be obtained by decreasing the line speed. At a substantially constant line speed, the cross sectional dimensions of the optical fiber may be substantially constant. The reduction of the cross sectional dimensions of the optical fiber may occur as the line speed increase, i.e. while there is an acceleration of the line speed. The increase of the cross sectional dimensions of the optical fiber may occur as the line speed decreases, i.e. while there is a deceleration of the line speed.

Drawing towers designed for producing optical fibers often focus on providing a very stable line speed to provide optical fibers with a high degree of uniformity over a long fiber length, i.e. optical fibers with e.g. a constant outer dimension over kilometers of fiber length. Such systems may hence not be suited for producing tapered optical fibers comprising an up-tapering and/or a down-tapering that requires a significant reduction or increase in the cross sectional dimensions of the optical fiber over few meters or few tens of meters.

The inventors of the present invention have realized new methods and drawing tower configurations, where an improved control over the line speed is provided.

The line speed v may be a sum of a contribution from a first capstan unit, which is capable of providing a substantially constant line speed v1 during a longer time interval, and a contribution from a line speed changing unit capable of providing said acceleration and/or deceleration during said shorter time interval, i.e. v=v1+v2, where v2 is the contribution from the line speed changing unit.

In one embodiment of the present invention, the line speed changing unit is comprised within said first capstan unit, such that said first capstan unit provides a substantially constant line speed during some time intervals, and said acceleration and/or deceleration during other time intervals.

In one embodiment of the present invention, the line speed changing unit and said first capstan unit are individual units, and wherein said first capstan unit provides a substantially constant contribution to said line speed over said longer time interval, while said line speed changing unit may provides an acceleration or a deceleration over said shorter time interval. The line speed changing unit may also provide a substantially constant contribution to the line speed, i.e. v2 has a substantially constant and finite value over a length of the optical fiber.

In one embodiment, the line speed changing unit changes its contribution to the line speed by increasing or decreasing the length of a fiber path followed by the drawn optical fiber from the first end of said preform to said first capstan unit.

In the context of the present invention, the phrase "fiber path" may refer to the path followed from the first end of said fiber preform to said first capstan unit. The path often comprises substantially straight sections and bends and turns provided by e.g. rotating supports, such as wheels.

In one embodiment, a length of the drawn optical fiber during the shorter time interval is displaced from following a first path to following a second path, where said second path differs in length from said first path. The displacement may be realized by a displacing unit comprised in said line speed changing unit. The displacing unit is also referred to as the displacement unit. In one embodiment the line speed is changed from said first line speed to said second line speed during the displacement of the length of the drawn optical fiber.

The length of the second path may be larger than the length of the first path, and the change of fiber path may include an acceleration, during which the displacement results in an increase in the line speed with the change of path (relative to when the drawn fiber follows the first path). If the displacement comprises a part with a constant contribution to the line speed from said line changing unit, the fiber is drawn with cross sectional dimensions according to a velocity that equals the sum of the contributions from the first capstan unit and the line speed changing unit. If the displacement reaches a level where it is maintained for a period of time, the contribution from the line speed changing unit is zero and the line speed is returned to the same magnitude as when the optical fiber followed the first path.

Below, a change in the fiber diameter and/or core area is often used as examples when describing the tapering of the optical fiber, but other features of the optical fiber could also have been used, and any description using one of these two features or both is not necessary limited to these features but may be equally valid for other features, such as the area of the cladding.

In one embodiment, the displacing unit comprises at least one support, which is capable of supporting the drawn fiber, and at least one translation device which moves the support such that the drawn optical fiber follows said first path before and said second path after the movement by said translation device.

When the movement of the support is stopped, there is no contribution from the line speed changing unit to the pulling force and the line speed is reduced to its value prior to the movement of the support, whereby the fiber diameter is reduced or increased to the value prior to the movement depending on the change in the length of the fiber path during the movement.

If the translation device increases the fiber path length while accelerating the support, there may be an increase in the pulling force applied to the first end of the fiber preform and the fiber diameter may decrease, i.e. the fiber is tapered down. Another way of describing this is that as the line speed increases while the feeding velocity is substantially constant, a longer section of fiber is drawn from the supplied preform material and through mass conservation the diameter of the optical fiber may be reduced.

If the translation device decreases the fiber path length, when accelerating the support, there may be a decrease in the pulling force applied to the first end of the fiber preform and the fiber diameter may increase.

If the support is moved such that the length of the fiber path increases, the contribution from the line speed changing unit is positive and the fiber diameter may be smaller compared to when the line speed unit is not moving. If the support then is decelerated, the positive contribution from the line speed changing unit is reduced and the fiber diameter and/or core area may increase. If the support is decelerated to a stop, this positive contribution equals zero.

If the support is moved such that the length of the fiber path decreases, the contribution from the line speed changing unit is negative and the fiber diameter may be larger compared to when the line speed unit is not moving. If the support is decelerated, the negative contribution from the line speed changing unit is reduced and the fiber diameter may decrease. If the support is decelerated to a stop, this negative contribution equals zero.

The line speed may be changed from said first line speed to said second line speed during the displacement of the length of the drawn optical fiber.

In one embodiment, the translation device is capable of moving said support at a predetermined velocity profile, where the predetermined velocity profile at least partly determines the contribution to the line speed from said line speed changing unit. The predetermined velocity profile may comprise one or more parts, in which the support is accelerated, decelerated, moved at a substantially constant velocity or maintained at a substantially constant position.

The predetermined velocity profile may comprise a part with an acceleration of said support, such as a part where the contribution to the line speed from said line speed changing unit is positive.

The said predetermined velocity profile may comprise a part with a substantially constant velocity, such that the line speed is kept at a substantially constant level which differs from the contribution from the first capstan unit. Hereby a waist section may be defined in the taper section.

The predetermined velocity profile may comprise a part with a deceleration of said support, such as a part, where the contribution to the line speed from said line speed changing unit decreases.

In one embodiment, the heating unit heats said first fiber material to a temperature around or above the melting temperature of said first material.

The preform holder and the heating unit are arranged to be moved relative to each other, i.e. the preform holder may be moved and/or the heating unit may be moved.

The predetermined velocity profile may comprise a part with substantially no movement of said support, such as a part where the contribution to the line speed from said line speed changing unit is substantially zero.

The predetermined velocity profile may comprise a part with a movement of said support where the contribution to the line speed from said line speed changing unit is negative. In one embodiment, the drawn optical fiber follows a first path and the predetermined velocity profile comprises a movement such that the fiber is displaced to a second path with a shorter path length, the movement resulting in deceleration of the line speed and an up tapering of the optical fiber.

The predetermined velocity profile may in principle be comprised of one or more parts with combinations of e.g. an acceleration and a deceleration, and a large variety of taper profiles may be realized using the method and the drawing tower according to the present invention.

In one embodiment, the predetermined velocity profile comprises an acceleration of the support followed by a part with substantially no movement of said support, such that the path length and the line speed increases during said acceleration of said support and is kept substantially constant during the part with substantially no movement of said support.

In one embodiment, the predetermined velocity profile comprises said acceleration of the support followed by said part with substantially no movement of said support, such that the path length and the line speed increases during said acceleration of said support and is kept substantially constant during the part with substantially no movement of said support. Depending on the duration of the acceleration, such a predetermined velocity profile may result in a long first taper section and a short second taper section.

The fiber preform may comprise at least a first air hole and a second end of said fiber preform is arranged in a preform holder comprising a substantially air tight first lumen being in fluid connection with at least said first air hole and with at least a first pressure controller, and the method according to the present invention may comprise pressurizing said first air hole to a first pressure during at least a part of the drawing of the tapered optical fiber. In the context of the present invention a substantially air tight lumen is taken to mean that pressure different from the surroundings can be maintained inside the lumen.

The fiber preform may further comprise at least a second air hole and the preform holder may comprise a substantially air tight second lumen in fluid connection with at least said second air hole and at least a second pressure controller, and the method according to the present invention may comprise pressurizing said second air hole to a second pressure during at least a part of the drawing of the tapered optical fiber In one embodiment, the first and second pressures differ at least during a part of the drawing of the optical fiber.

In one embodiment, the first pressure and/or said second pressure is substantially constant during the drawing of the optical fiber.

In one embodiment, the first pressure and/or said second pressure changes during the drawing of the optical fiber.

In one embodiment, the predetermined velocity profile comprises a part with an acceleration of said support. When the support is accelerated the contribution to the line speed from said line speed changing unit may be positive or negative depending on the change in path length during this part of the velocity profile. When the acceleration is part of a movement which decreases the path length, the contribution to the line speed from said acceleration may be negative and the fiber diameter may increase during the acceleration. When the acceleration is part of a movement which increases the path length, the contribution to the line speed from said acceleration may be positive and the fiber diameter may decrease during the acceleration. If the support is already moving at the onset of the acceleration and the velocity of the support is further increased, the acceleration may further increase the size of the negative or positive contribution from the line speed changing unit and the fiber diameter may be even further increased or decreased, respectively.

In one embodiment, the predetermined velocity profile comprises a part with deceleration of said support. Similar to the case, where the predetermined velocity profile comprises a part with acceleration, the contribution to the line speed from said line speed changing unit may be positive or negative depending on the change in path length during the deceleration. When the deceleration is part of a movement which decreases the path length, the deceleration reduces negative contribution to the line speed from said line speed changing unit and the fiber diameter may decrease during the deceleration. When the deceleration is part of a movement which increases the path length, the deceleration reduces the positive contribution to the line speed from said line speed changing unit and the fiber diameter may increase during the deceleration.

In one embodiment, the predetermined velocity profile comprises a part with a substantially constant velocity. If the first capstan unit provides a substantially constant contribution to the line speed in this part, the line speed may be substantially constant and the fiber diameter may accordingly be substantially constant. If the movement with the substantially constant velocity is such that the length of the fiber path is reduced, the fiber diameter may be larger than when the contribution from the line speed changing unit is zero. If the movement with the substantially constant velocity is such that the length of the fiber path is increased, the fiber diameter may be smaller than when the contribution from the line speed changing unit is zero.

In one embodiment, the predetermined velocity profile comprises a part with substantially no movement of said support, such as a part where the contribution to the line speed from said line speed changing unit is substantially zero.

The changes in the contribution from the line speed changing unit may occur on a time scale where the contribution from the first capstan unit is substantially constant.

In one embodiment, the support comprises at least one wheel which is capable of supporting the drawn optical fiber while allowing it to be displaced relative to the support.

In one embodiment, the displacing unit comprises a plurality of supports, such as wheels, arranged on one or more translation devices that are capable of moving at least a part of said supports relative to each other. The translation device may be arranged to move said plurality of supports such that two neighboring supports displace the drawn fiber in opposite directions relative to the first path. The displacement unit may e.g. be arranged so that the drawn fiber follows a substantially straight path though the displacement before an acceleration of the supports, while after the acceleration the path thought the displacement unit follows a meander pattern. The opposite situation may also be used such that the acceleration and movement of the support is such that the fiber goes from following a meander path to a substantially straight path through the displacement unit. Such a configuration may be relatively compact and may provide a large change in path length relative to the movement of the supports.

The method and the drawing tower according to the present invention may be used to produce optical fibers with a large variety of profiles of the feature along the longitudinal direction of the optical fiber. It is for instance possible to realize a profile where the core area of the optical fiber is increased over a length of the optical fiber relative to the core area at the first and/or second end of the optical fiber. Such a profile may be realized by initially arranging the drawn optical fiber to follow a fiber path, which is longer than the shortest fiber path of the drawing tower. During the drawing a length of the optical fiber is then displaced to follow the shortest path and during the acceleration of this displacement, the core area may increase. Subsequently, the drawn optical fiber is displaced to again follow the longer fiber path and during the acceleration of this displacement the core area may decrease.

In one embodiment, the drawing tower comprises a control system for controlling at least the feeding unit and/or the heating unit.

The translation device may be controlled by a control unit which is a separate unit or a part of said control system.

The pressure control may be synchronized with the tapering of the optical fiber.

With a synchronized pressure control an optical fiber may be realized wherein the core region is tapered over a tapering section while the outer fiber diameter is maintained substantially constant.

The synchronization of the pressure control may be such that the pressure in at least a first group of air holes is changed before and/or during and/or after the tapering of the optical fiber.

In embodiments, where the pressure the first group of air holes is changed before the tapering, i.e. before the line speed is increased, the outer fiber diameter and/or the cross sectional area of the air holes of the first group of holes in the optical fiber may be increased prior to the tapering.

In one embodiment, the drawing tower comprises a pressure control system comprising a first enclosure and a flow system connecting said first enclosure and the first group of air holes via a flow path, said pressure control system comprising a pump for pressurizing said first enclosure, said flow system comprising an on/off valve which is capable of opening within a first period of time $\Delta t_1$, said first enclosure being brought into fluid contact with said first group of air holes when said valve is opened, wherein $\Delta t_1$ is smaller than about 10 such as smaller than about be smaller than about 5 seconds, such as smaller than about 2 second, such as smaller than about 1 second, such as smaller than about 0.5 second, such as smaller than about 0.2 second, such as smaller than about 0.1 second, such as smaller than about 0.05 second, such as smaller than about 0.01 second, such as smaller than about 0.001 second.

The drawing tower may comprise a coating unit capable of providing a protective coating to said tapered optical fiber. In one embodiment, the coating unit is arranged to apply said coating at a position between said line speed changing unit and said first capstan unit. In one embodiment, the coating unit is arranged to apply said coating at a position between said line speed changing unit and said preform holder.

In one embodiment, the feeding velocity and the contribution from the first capstan unit to the line speed can be changed independently during the drawing of an optical fiber.

The first group of air holes may comprise one or more air holes.

In one embodiment the pump which is connected to the first enclosure is capable of establishing an air pressure in said first enclosure which is sufficiently high such that the pressure in said flow system is increased by a factor of about 1.5 when said on/off valve is opened by a factor of about 1.5, such as by a factor of about 2, such as by a factor of about 2.5, such as by a factor of about 3, by a factor of about 3.5, such as by a factor of about 4, such as by a factor of about 5, such as by a factor of about 7, such as by a factor of about 8, such as by a factor of about 10, such as by a factor of about 12, such as by a factor of about 15, such as by a factor of about 20.

In one embodiment, the pressure established in said first enclosure is higher than 15 kPa, such as higher than 20 kPa, such as higher than 25 kPa, such as higher than 30 kPa, such as higher than 40 kPa, such as higher than 50 kPa, such as higher than 60 kPa, such as higher than 70 kPa, such as higher than 80 kPa, such as higher than 100 kPa.

In one embodiment, the first enclosure has a volume which is large compared to the volume, $V_{fs}$, of the section of the flow system connecting the first enclosure and the first group of air holes. The ratio between volume of the first enclosure and $V_{fs}$ may be more than about 1.5, such as more than about 2, such as more than about 3, such as more than about 4, such as more than about 5, such as more than about 7, such as more than about 10, such as more than about 20. For large values of this ratio the pressure applied to the air holes after the on/off valve has been opened will be substantially identical to the pressure established in the first enclosure when the on/off valve is opened.

In one embodiment the pump which is connected to the first enclosure is capable of reducing the air pressure in said first enclosure to a sufficiently low level such that the pressure in said flow system is reduced by a factor of about 1.5 when said on/off valve is opened, such as by a factor of about 2, such as by a factor of about 2.5, such as by a factor of about 3, by a factor of about 3.5, such as by a factor of about 4, such as by a factor of about 5, such as by a factor of about 7, such as by a factor of about 8, such as by a factor of about 10, such as by a factor of about 12, such as by a factor of about 15, such as by a factor of about 20.

The on/off valve may in principle comprise any type of valve which is capable of opening within said first period of time, such as a magnetic valve.

The pressure control system may comprises a pressure head being arranged in the flow path between said on/off valve and said preform, said pressure head comprising a first inlet for connecting to the first enclosure and a second inlet for connecting to a second pressure source, and an outlet for connecting to said first group of air holes.

In one embodiment, the pressure established in said pressure head by said second pressure source is below the pressure established in said first enclosure before and/or after said on/off valve is opened. The ratio between the pressure established in said first enclosure and the pressure establish in the pressure head by the second pressure source may be more than 1.2, such as more than about 1.5, such as more than about 1.8, such as more than about 2, such as more than about 2.5, such as more than about 3, such as more than about 3.5, such as more than about 4, such as more than about 5, such as more than about 6, such as more than about 7, such as more than about 10, such as more than about 15.

In one embodiment, the flow system is capable of disconnecting said second pressure source from said first group of air holes when said on/off valve is opened. A second on/off valve may be arranged in relation to said pressure head, second on/off valve being capable of disconnecting said second volume from said first group of air holes.

In one embodiment, the line speed and the first period of time $\Delta t_1$ is such that a fiber section with length $L_p$ is drawn from the preform during the first period of time $\Delta t_1$ wherein $L_p$ is less than 100 m, such as less than 50 m, such as less than 20 m, such as less than 10 m, such as less than 8 m, such as less than 6 m, such as less than 5 m, such as less than 4 m, such as less than 3 m, such as less than 2 m, such as less than 1 m, such as less than 0.5 m, such as less than 0.1 m.

In one embodiment, the pressure control system comprises a pump arranged to change the pressure in said volume arranged in fluid contact with said first group of air holes within said first period of time. The pump may be capable of changing the pressure in said volume by a factor of about 1.5 within said first period of time, such as by a factor of about 2, such as by a factor of about 2.5, such as by a factor of about 3, by a factor of about 3.5, such as by a factor of about 4, such as by a factor of about 5, such as by a factor of about 7, such as by a factor of about 8, such as by a factor of about 10, such as by a factor of about 12, such as by a factor of about 15, such as by a factor of about 20.

With a pressure control system which enables a fast change of the air pressure provided to the flow system in fluid communication with the holes of a preform for a microstructured optical fiber, several features of the optical fiber may be changed over a few meters length of the drawn optical fiber. For example the cross sectional dimension of the air holes may be increased over a few meters.

The flow system may be in fluid communication with a first and/or a second lumen on said preform holder.

In one embodiment, a relative low pressure is connected to the first group of air holes in the preform for adjusting the relative hole size (hole diameter to pitch) to a low value. The relative low pressure may be provided by said second pressure source. Meanwhile a relative high pressure may be established in said first enclosure which may also be referred to as lumen. When opening the on/off valve the pressure in the flow system is increased towards the relative high pressure and the relative hole size may increase to a high value.

In a method according to the present invention utilizing the drawing tower according to the invention, the initial relative hole size is controlled at least in part by a relative low pressure provided by e.g. said second pressure source. At a given time the on/off valve is opened and the pressure in the flow system increases, such that the air holes and the pitch in the drawn microstructured optical are increased over a length. This fiber may be made with constant line speed and preform feed speed, i.e. the glass cross section area is constant. This length over which the change from relative low to relative large air holes occurs may be controlled by the line speed. A relatively low line speed may result in that a change occurs over a relative short length. In one embodiment, the pressure established in said first enclosure is such that the pressure in the flow system after the on/off valve is opened is higher than the steady state pressure required to obtain the desired relative hole size. This may also provide that the change occurs over a shorter length $L_p$, In one embodiment, the relative hole size is initially adjusted to have a relative low value by providing a relative low pressure in the flow system. A high pressure is established in the first enclosure. At a given time the on/off valve is opened and the pressure in the flow system is increased, whereby the cross sectional dimension of the air holes and the pitch of the drawn optical fiber increases over a length of the optical fiber. After a certain length the fiber may be tapered down to a waist value of a feature of the optical fiber, such as the outer fiber diameter or lattice pitch. The taper may be realized using a drawing according to the present invention.

For obtaining the change over a shorter length, the draw speed may be low and the pressure established in first enclosure may be higher than steady state for the large relative hole size. The first taper section may be followed by a second taper section. In one embodiment, the value of a feature of the optical fiber, such as the outer diameter, is substantially the same after the tapered section as before the taper section.

In one embodiment, the pitch may be adjusted by modifying the line speed while the air pressure in air holes of a preform is increased. For example, the pitch could be maintained while the relative hole size is increased.

BRIEF DESCRIPTION OF DRAWINGS

The invention will be explained more fully below in connection with a preferred embodiment and with reference to the drawings in which:

FIG. 4 and FIG. 5 show different taper profiles that may be realized using the drawing tower according to the present invention.

FIG. 6 shows a concave curve.

The figures are schematic and may be simplified for clarity. Throughout, the same reference numerals are used for identical or corresponding parts.

Figure 1:
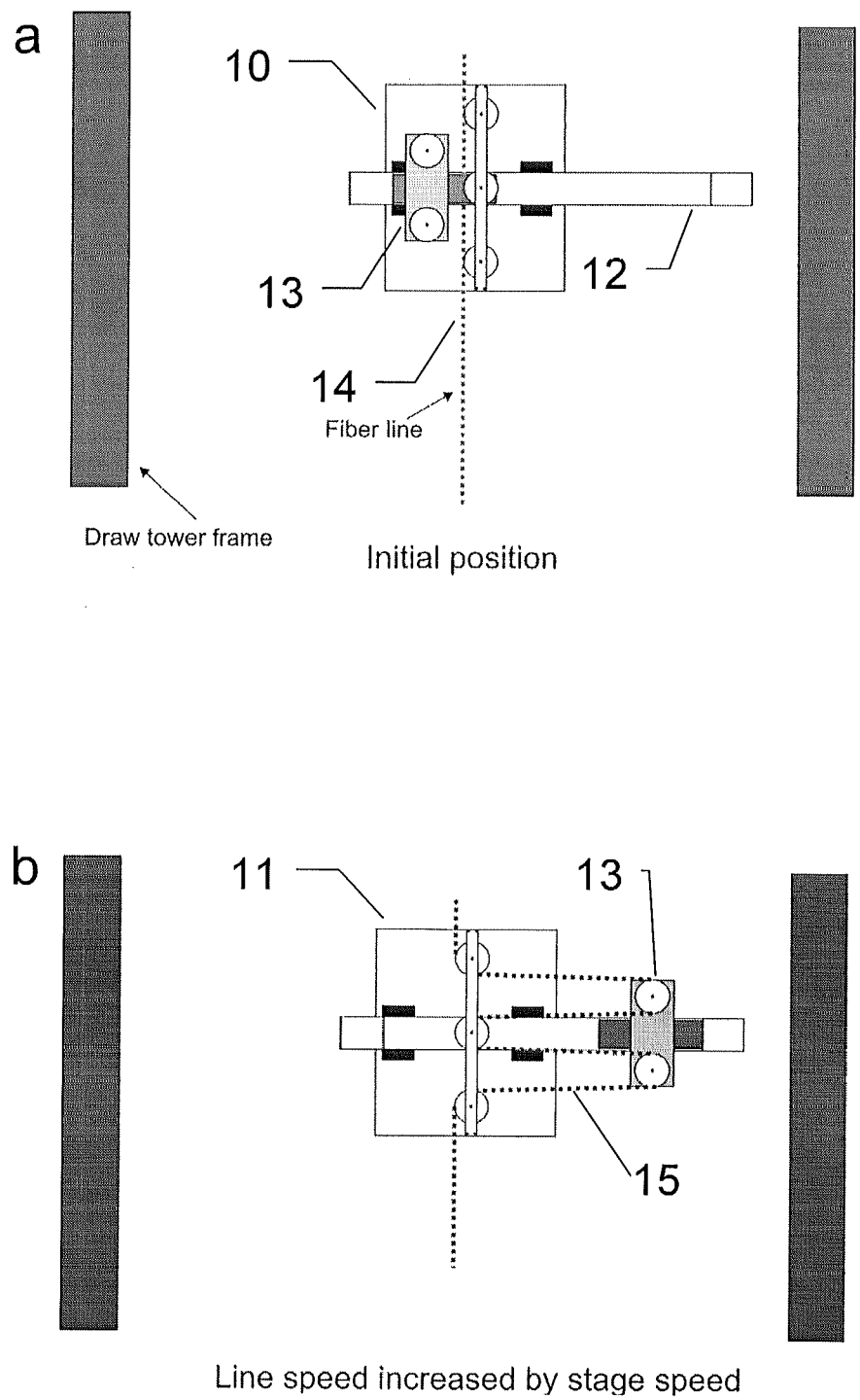
FIG. 1 shows an embodiment of a line speed changing unit in a drawing tower according to the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The invention is defined by the features of the independent claim(s). Preferred embodiments are defined in the dependent claims. Any reference numerals in the claims are intended to be non-limiting for their scope.

Some preferred embodiments have been shown in the foregoing, but it should be stressed that the invention is not limited to these, but may be embodied in other ways within the subject-matter defined in the following claims.

With reference to FIG. 1 is described a capstan configuration wherein the line speed changing unit 10, 11 is an independent unit arranged along the fiber path from the first end of the preform to the first capstan unit. The line speed changing unit comprises a displacement unit with a translation stage, where two supports are arranged on a common plate 13, which may be translated along a rail 12. When the plate 13 is translated from the position seen in the upper part "a" of the figure to the position seen in the lower part "b" of the figure, the fiber is displaced from following the first path 14 to the second path 15. With the two supports (wheels) arranged on the common plate and three wheels placed stationary along the first path, the difference in the length of the first and second paths is increased compared to a configuration, where the displacement unit only have one support on the translated plate. The difference in the length of the first and second paths may be increased by adding more supports on the translated plate and on the stationary part. Further the difference may be increased, if the supports that are stable in the illustrated configuration were mounted on e.g. a second common plate that was moved in a direction opposite to the first common plate 13.

Figure 2:
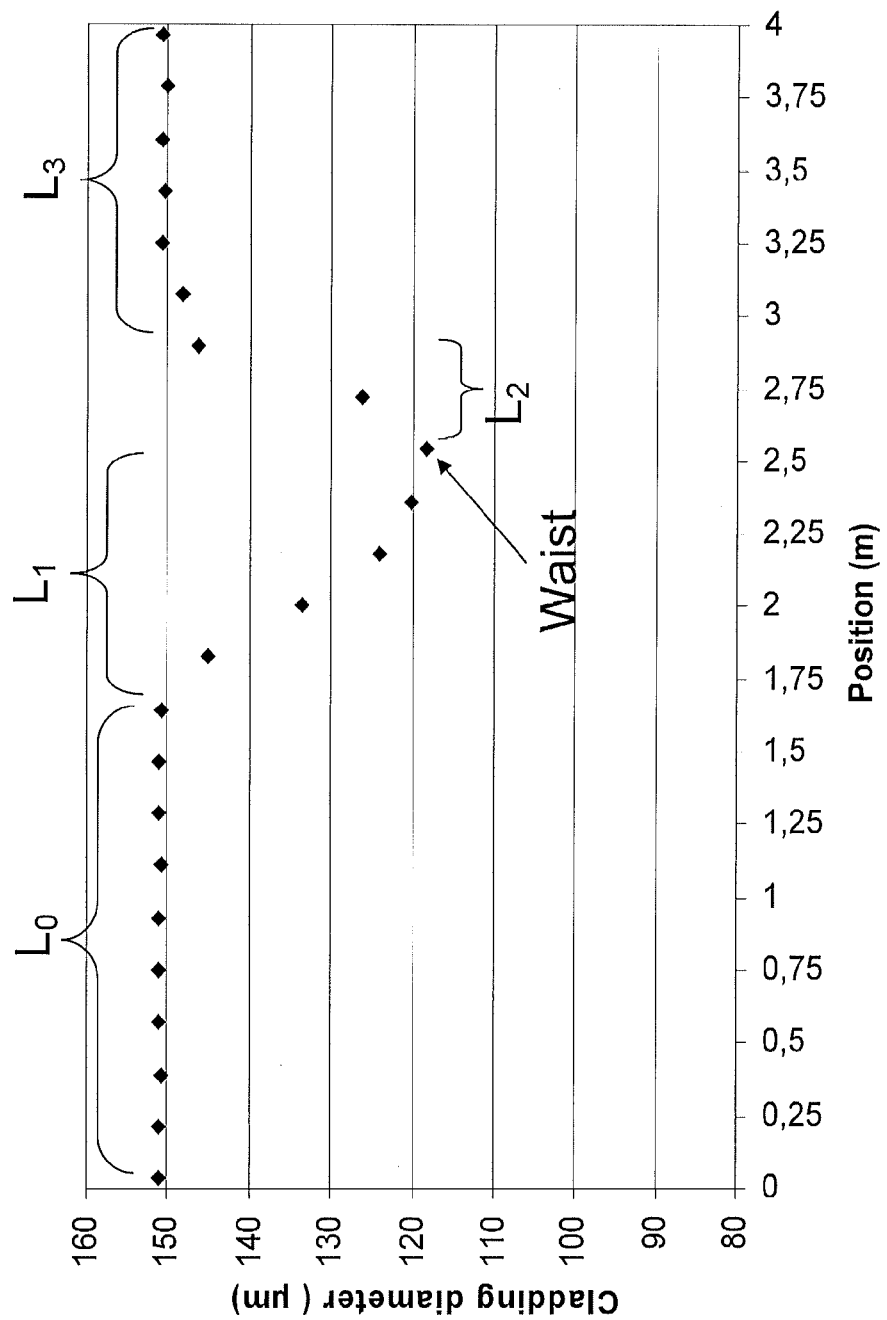
FIG. 2 shows measure cladding diameter along a drawn tapered optical fiber.
Figure 3:
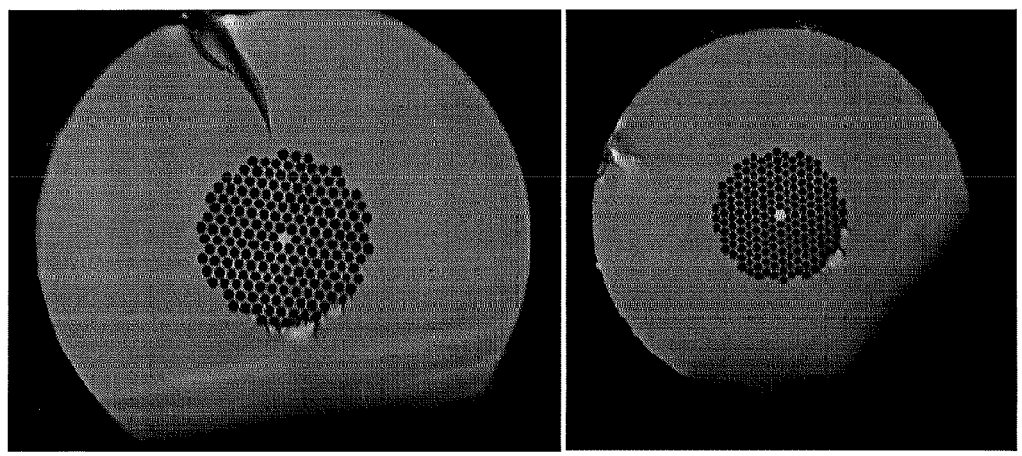
FIG. 3 shows images of input end and waist of a drawn tapered optical fiber.
Figure 7:
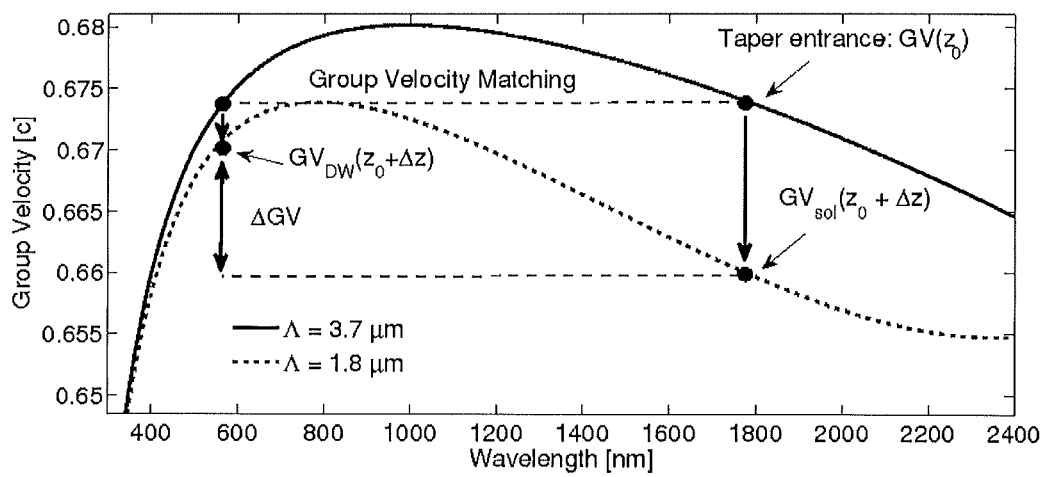
FIG. 7 shows GAM curves for two values of the pitch of a microstructured optical fiber
Figure 8:
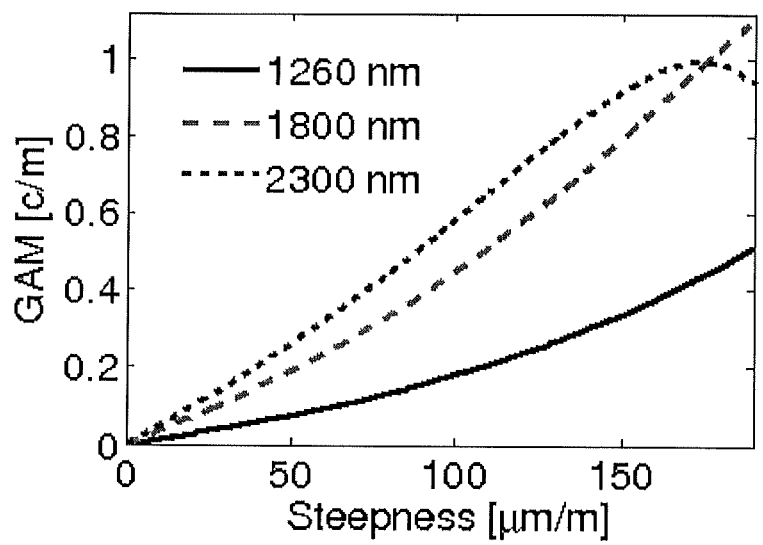
FIG. 8 shows GAM versus the gradient of the pitch along the first taper section for different wavelengths.
Figure 9A:
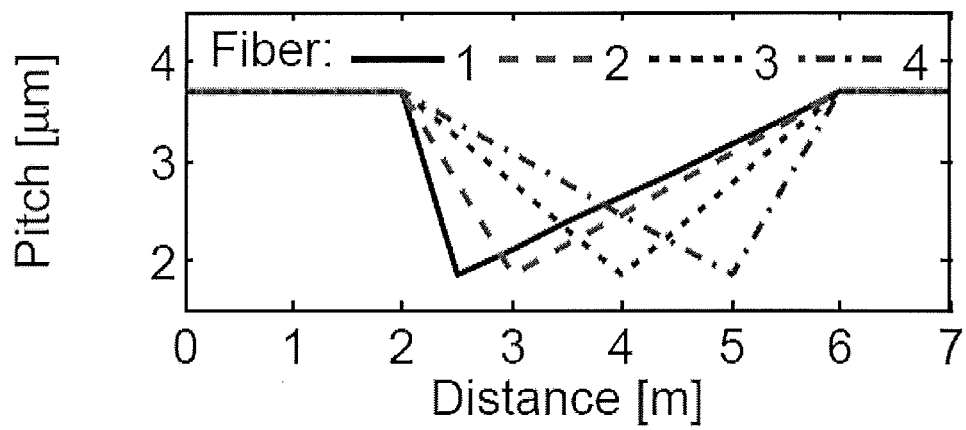
FIG. 9 shows different taper profiles and the energy at the blue edge for different gradients of the pitch along the first taper section
Figure 9B:
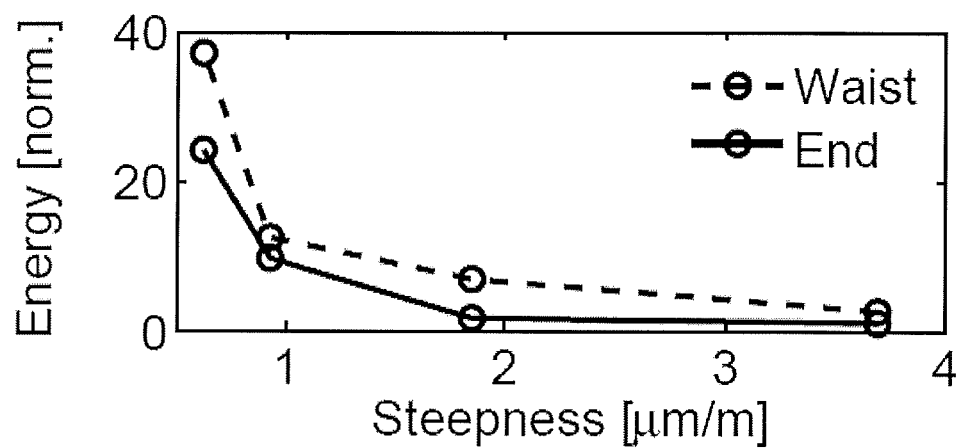

FIG. 2 and FIG. 3 show results from a section of a drawn optical fiber according to the present invention, the section itself forming a fiber according to the invention. In FIG. 2 the variation in the cladding diameter along the optical fiber is plotted. The input end is at 0 with a diameter of about 150 μm. The section before the taper has a length, $L_0$, of about 1.6 m. The cladding diameter is tapered down from 150 μm to 118 μm over the first taper section starting at 1.6 m and ending at the waist around 2.6 m, i.e. a length $L_1$ of about 1 m. In the second taper section from 2.6 m to 3.2 m, the cladding diameter is tapered up to 150 μm again, i.e. a length $L_2$ of about 0.6 m. The section following the up-taper to the output end at 4 m has a length $L_3$ of about 0.8 m. FIG. 3 shows images of the cross section of the optical fiber at the input end (left image) and at the waist (right image).

Often the length of $L_3$ will be non-zero to allow a faulty splicing to be corrected without having to sacrifice a length of the second taper section. Other taper designs could be realized such as those illustrated in FIG. 4 and FIG. 5 showing schematic representation of some of the possible taper designs. The figures show cladding diameters versus position along the optical fiber. A 10 m long piece of fiber with a cladding diameter of 150 μm and a pitch of 4.4 μm is arranged before the taper section, wherein the optical fiber is tapered down to a cladding diameter of 70 μm and a pitch of 2.0 μm. The fiber is a microstructured fiber produced from substantially pure silica and a cladding formed by air holes laid out in a triangular patter with a $d_f/\Lambda$ of about 0.85, the relative large size suitable for providing a blue edge at a low wavelength (see discussion below in relation to FIG. 18). Similar to the fibers discussed below the ration $d_f/\Lambda$ is substantial constant. From FIG. 18 it can be seen that for such large cores a pitch at about 2 μm is optimum for producing a blue edge at a low wavelength which will be at about 350 nm. In the first taper section, the displacement unit is accelerated to provide a longer fiber path providing a down tapering of the optical fiber. In some cases the displacement unit is brought to an immediate stop at a steady position whereby the fiber is tapered up to the cladding diameter of 150 μm over a short length. As long as the displacement unit is positioned at this steady position (and the first capstan unit provides a constant contribution to the line speed), the cladding diameter is maintained at 150 μm. At the right side of each curve is illustrated an increase in the fiber diameter compared to the diameter at the first longitudinal position. This increase will occur when the displacing unit is returned to its initial position whereby the path length is reduced. When making several taper sections during drawing, this section with increased cladding diameter may be used to identify where the optical fiber may be cut in smaller pieces each containing a taper section.

Figure 10:
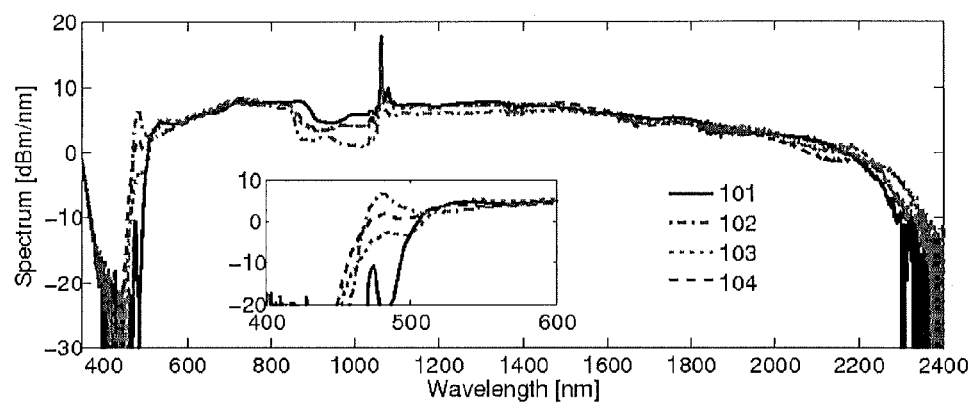
FIG. 10 shows supercontinuum spectra for tapered fibers according to the invention

FIG. 10 shows supercontinuum spectra for four different configurations with the insert focusing on the blue edge of the spectrum. All fibers used for these measurements were silica based microstructured optical fibers with a air holes arranged in a substantially hexagonal lattice having a relative hole size (hole diameter to pitch ratio) of 0.52 and a pitch=3.3 μm. In the tapered fibers, the pitch is tapered down to 2.5 μm at the taper waist. A reference measurement 101 was made on a 10 m long uniform fiber (referred to as Fiber 1). Two of the shown spectra 103, 104 were measured on a second fiber (referred to as Fiber 2) having a taper in which the lengths of the first taper section, the waist and the second taper section were 1.25 m, 0.25 m, and 0.5 m, respectively. Fiber 2 had 5 m long uniform sections before and after the taper. Spectrum 103 show the supercontinuum when Fiber 2 was pumped from the output end, i.e. the pump light propagating in the fiber such that it reaches the second taper section before the first taper section. Spectrum 104 show the supercontinuum when Fiber 2 was pumped from the input end, i.e. the pump light propagating in the fiber such that it reaches the first taper section before the second taper section. Spectrum 102 shows a measurement on a third fiber (referred to as Fiber 3) which had a longer taper section with the first and second taper sections having a length of 14 m and 1 m, respectively. In Fiber 3, uniform sections of the fiber of lengths 2 m and 1 m were arranged before and after the taper section, respectively. The spectrum 102 is measured when launching light from the input end of Fiber 3.

In general, the spectra of FIG. 10 verify that a tapered section shifts the short wavelength edge, referred to as the blue edge, towards shorter wavelengths (i.e. from about 490 nm to about 430 nm) when comparing spectra 102, 103 and 104 to the spectrum 101 of the uniform optical fiber. The rapidly fluctuating light/spikes measured at values below about −20 dBm/nm for shorter wavelengths than the edge (here below about 450 nm) is not considered part of the supercontinuum. This light is attributed to multimode effects and measurement artifacts. The fibers were pumped by a pump source emitting 10 ps pulses at 1064 nm with an average output power of 14 W at a repetition rate of 80 MHz. The results obtained are not as such limited to the applied pump source. For example, similar result are expected from pump sources emitting light from about 900 nm to about 1300 nm and with pulse lengths of about 1 ps to 50 ps. Furthermore other pump laser may also be suitable, as previously discussed.

As clearly seen in the insert, there is significantly stronger signal at the blue edge, when Fiber 2 is pumped from the input end (spectrum 104) than when the same fiber is pumped from the output end (spectrum 103). This observation provides evidence that a smaller gradient in the first taper section may provide a stronger signal at the blue edge of the supercontinuum. That is, a slow down taper could be preferable when the available optical power at the blue edge is an important parameter.

Further, the spectrum 102 of Fiber 3 (having the longest first taper section) is clearly that with the strongest signal at the blue edge compared to the other fibers.

Figure 11:
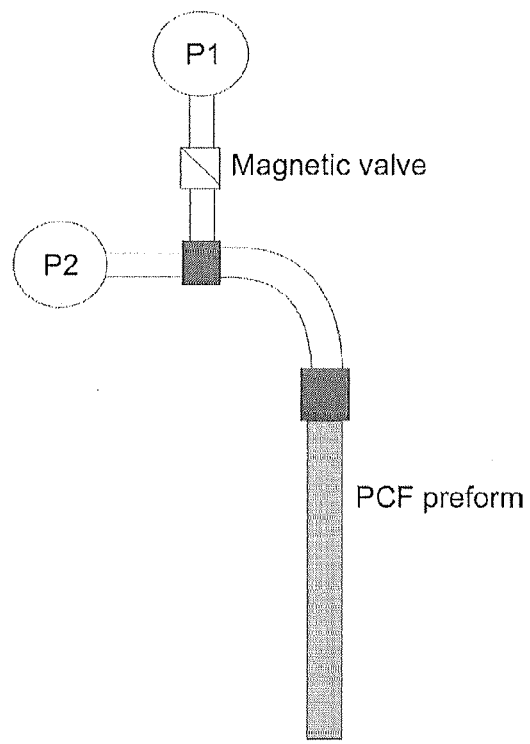
FIG. 11 shows a schematic setup of a pressure control system for a rapid change of the pressure applied to the air holes of a preform for a microstructured optical fiber

FIG. 11 shows an example of a drawing tower comprising a pressure control system. A pressure P2 may continuously be applied to the flow system while a P1 is established in the first enclosure. When the magnetic valve is opened the pressure P1 dominates the pressure in the flow system and a fast change in the pressure applied to the PCF preform (the phrases PCF and microstructured are used interchangeably) may be obtained.

Figure 12:
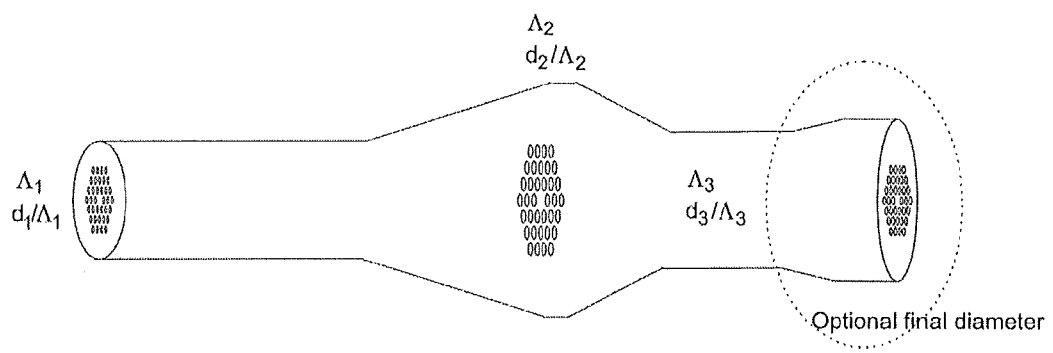
FIG. 12 shows an example of how some features may change along the optical fiber
Figure 13:
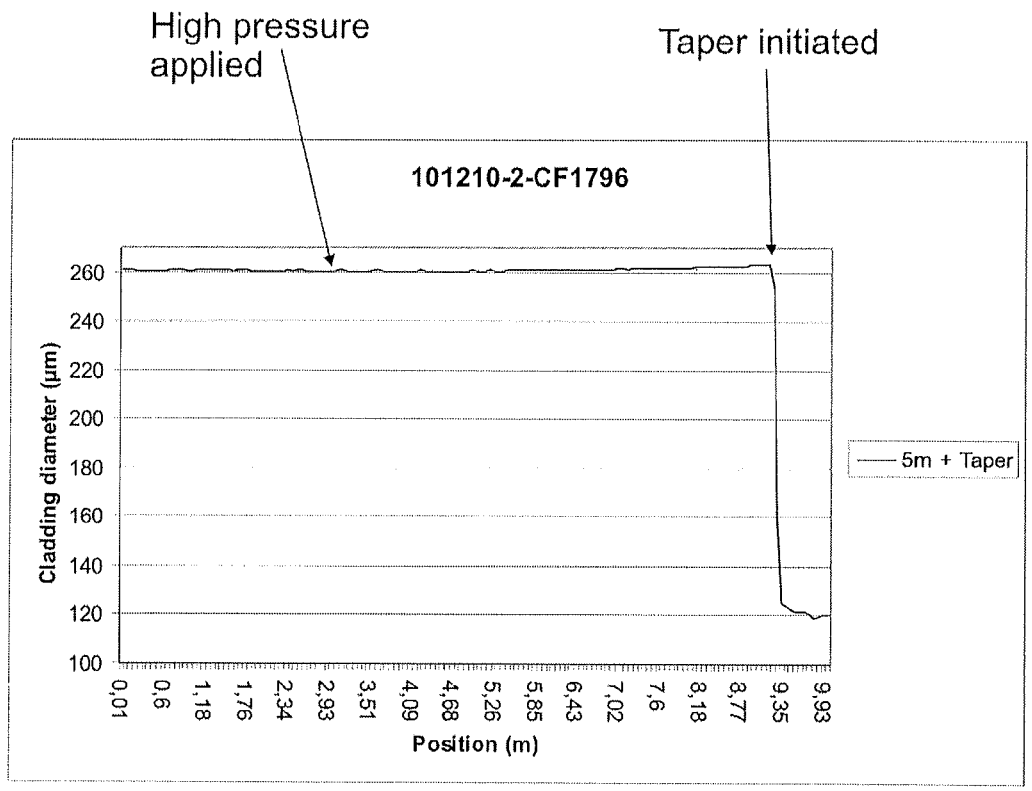
FIG. 13 shows the variation in the cladding diameter of a microstructured optical fiber
Figure 14:
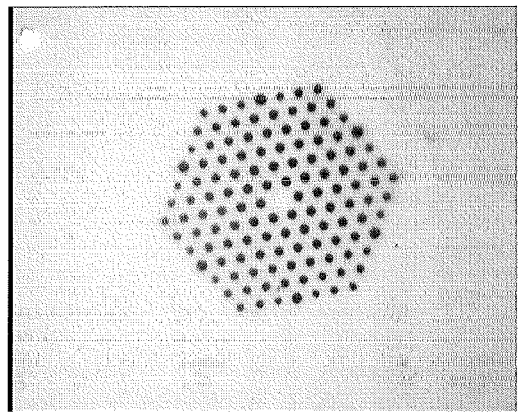
FIG. 14 and FIG. 15 show a cross section of an example of a microstructured optical fiber drawn with the drawing tower at the input and taper waist respectively.
Figure 15:
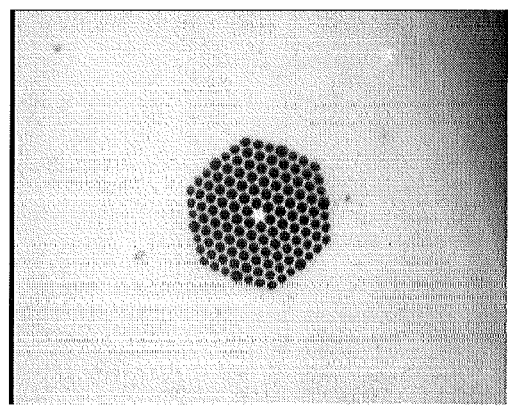

FIG. 12 shows an example of how some features may change along the optical fiber when the pressure control and the tapering of the drawing tower according to the present invention is applied FIG. 13 shows the variation in the cladding diameter of a microstructured optical fiber drawn with the drawing tower comprising the pressure control system according to the present invention. The furnace speed was 1820 Celcius, the preform feeding speed was 1.65 mm/min and the line speed at which the fiber is drawn from the preform was 7.8 m/min. The pressure in the first enclosure is 40 kPa while the pressure applied by the second pressure source is 11.7 kPa. The outer cladding diameter of the drawn optical fibers is 262 µm prior to the pressure/taper process. The on/off valve is opened at the position corresponding to 3 m in the figure such that the cladding diameter increases over the next 6 meters. At the position corresponding to 9 m in the figure the taper is initiated and the cladding diameter is reduced. The relative hole size at the start of the taper is 0.516 which is increased to 0.810 at the end. The inner pitch is 3.26 µm at the start and 2.20 µm at the end of the taper FIG. 14 and FIG. 15 show images of the start and end, respectively, of the taper optical fiber described in FIG. 13.

Figure 16:
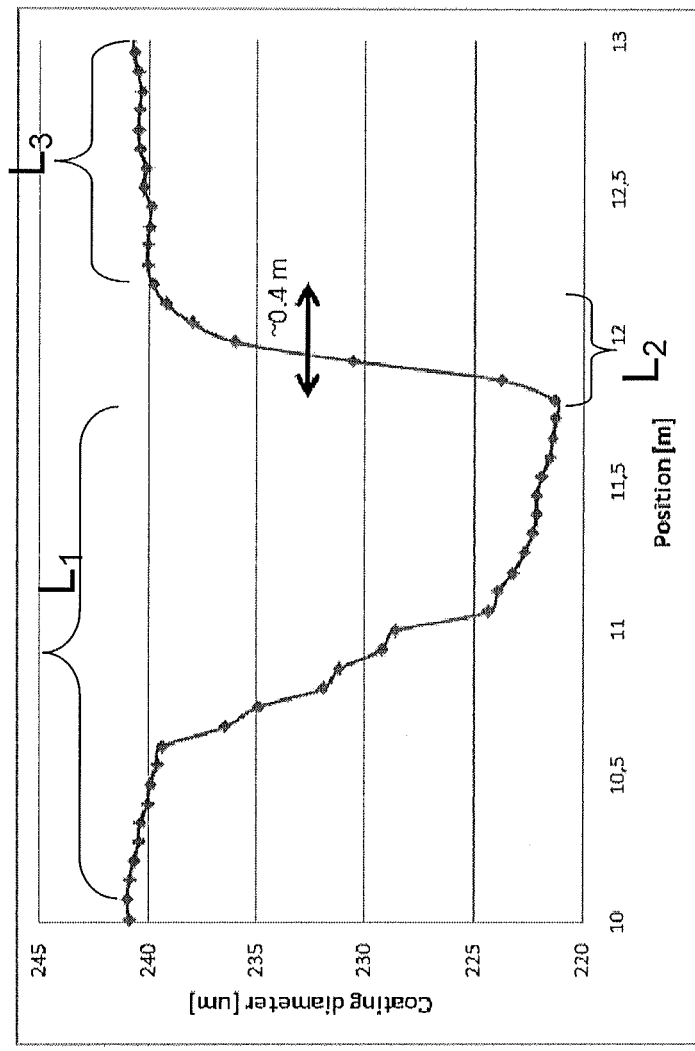
FIG. 16 shows the pitch as a function of longitudinal position of a microstructured fiber according to the invention.

FIG. 16 shows a tapered fiber according to the invention. The fiber is a microstructured fiber made from substantially pure silica and with a cladding formed by air holes running along the length of the fiber. In a cross section of the fiber the holes are laid out in a triangular layout pattern similar to that of FIG. 14. The ratio of the diameter of the air holes, $d_A$, and the pitch, $\Lambda$, between the holes is 0.52 at the input end. This property is substantially constant through the taper, whereas the pitch is 3.3 µm at the input end and about 2.5 µm at the waist. The mapped feature is the diameter of the coating fiber as a function of length. Inspection of cross sections of a tapered fiber have shown that the diameter of the coated fiber follows the shape of the pitch well but that magnitude of the pitch does not scale linearly with the diameter of the coated fiber. For example the pitch may be 25% reduced at the waist whereas the diameter of the coated fiber is only reduced by 10%. However, the experiments show that the magnitude of the pitch at least at the waist scales well with the outer cladding diameter (i.e. the diameter of the glass to be coated) but the slope of the taper sections has a tendency to deviate. Accordingly, a reduction of e.g. 50% of the outer cladding diameter corresponds substantially to a reduction of 50% of the pitch. The input end is in this graph located at 0 m (not shown). The length of the down tapering, $L_1$, is about 1.8 m long and the length of the up tapering, $L_2$, is about 0.4 meters. The down tapering has initially a fairly low gradient to enhance the coupling to the blue edge as discussed above. Finally, the length of the fiber after the taper, $L_3$, is about 0.8 m. In many practical applications of such a fiber in supercontinuum generation $L_3$ is often shorter to avoid temporal broadening of the spectrally very broad supercontinuum, which is commonly at its maximum spectral width close to the taper waist. Similar tapers may be obtained with other dimensions of the fiber.

Figure 17A:
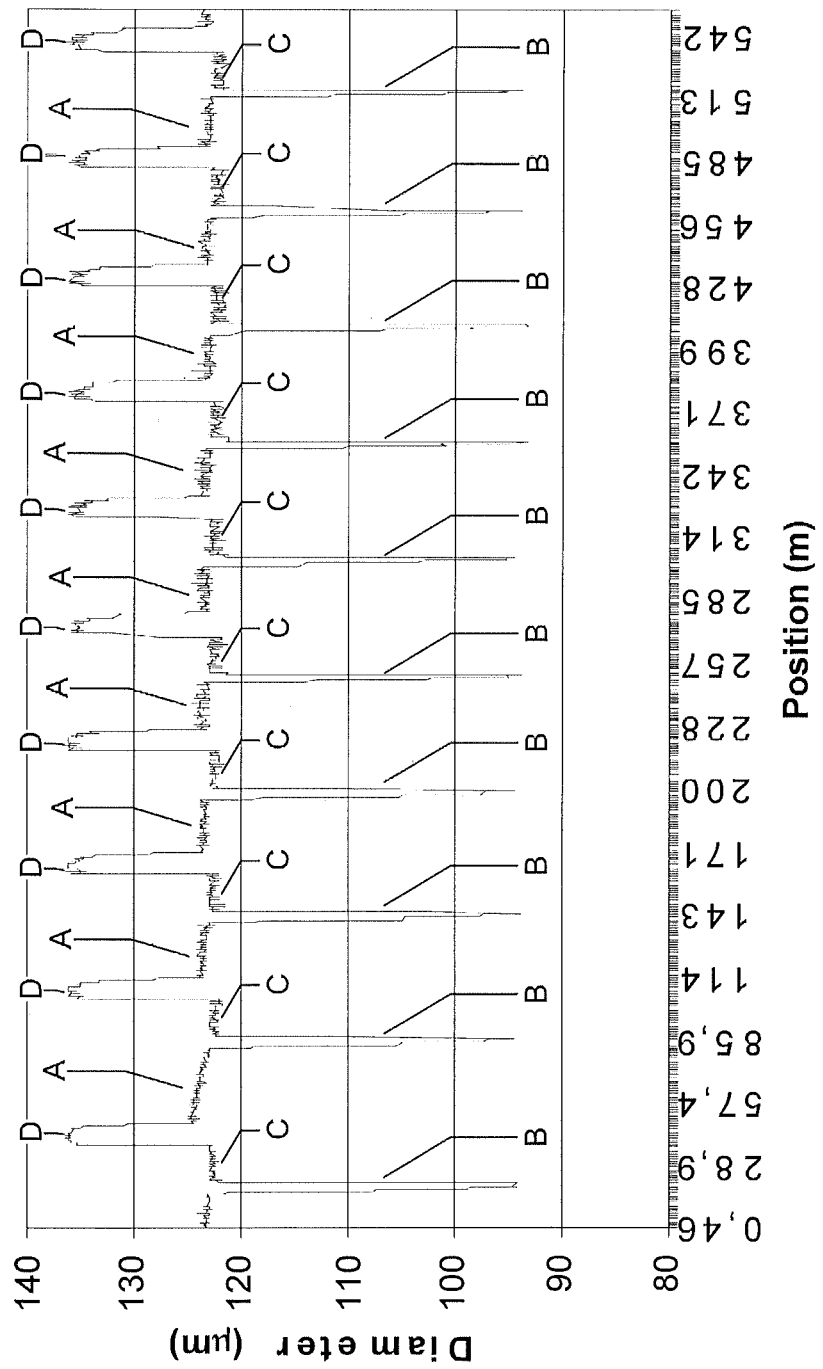
FIG. 17a shows the diameter as a function of longitudinal position along the fiber. The fiber comprises several tapers so that subsections may be formed from the fiber with a taper according to the invention.
Figure 17B:
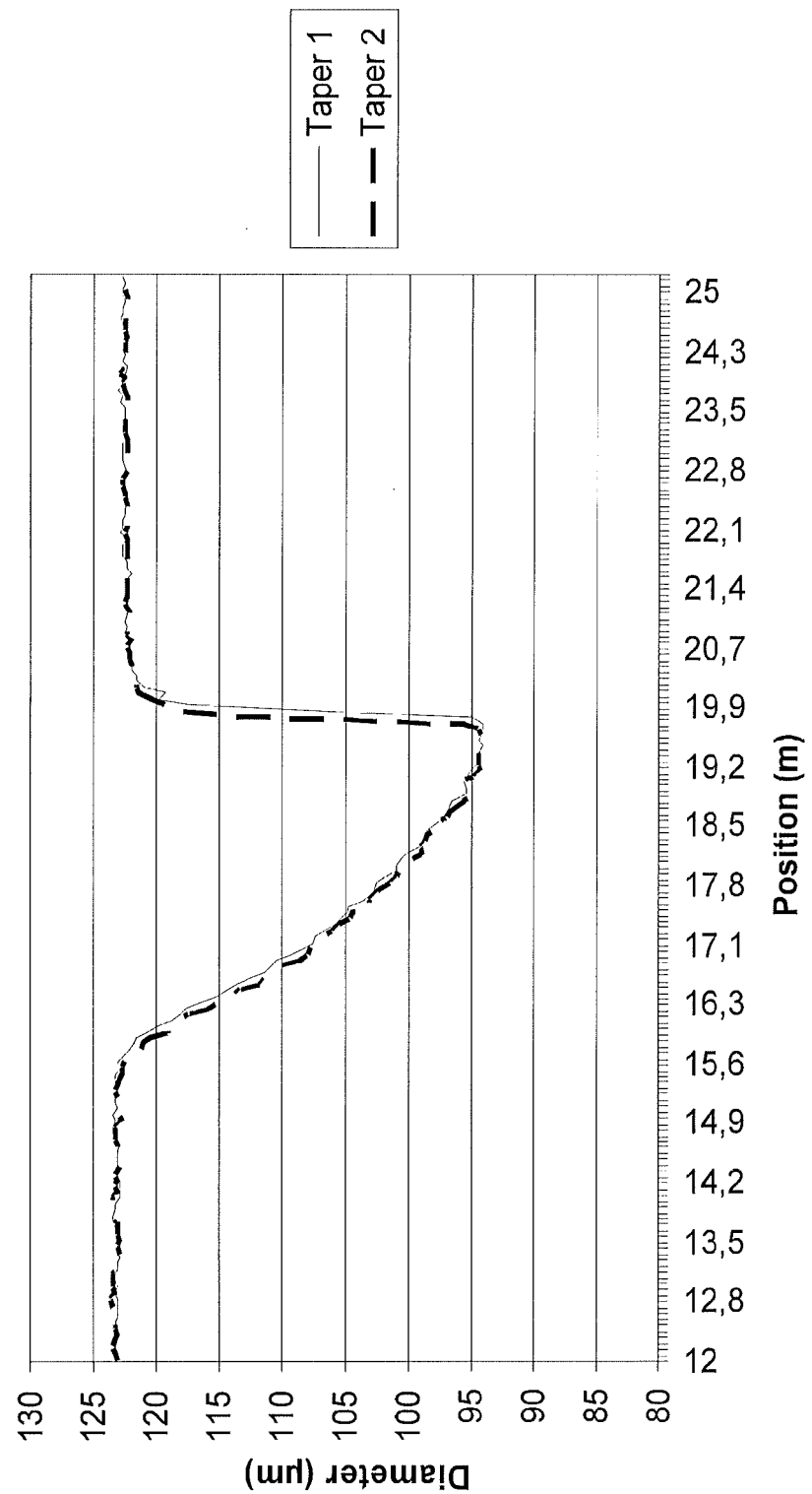
FIG. 17b shows two tapered sections of FIG. 17a overlaid to show an example of the reproducibility of the tapered section.

FIG. 17a shows a fiber with multiple tapers (sections B). The taper is oriented with a relatively long down taper and a short up taper. The sections A and C provide substantial constant parts, which are suitable for having an input and output of the fiber. The fiber was produced in a drawing tower with a line speed changing unit according to FIG. 1. The sections A correspond to the displacement unit at rest in the initial position according to FIG. 1a. During the down tapering of the sections B the displacement unit is moved to a new position, as illustrated in FIG. 1b, and then stopped, which causes the fiber to realign to substantially the same line speed and dimensions of the fiber. The sections D with large diameter are the result of reinitializing the line speed changing unit to its initial position. Usually a fiber according to the invention is cut from the drawn fiber and comprises a section A, a section B and a part of a section C, where as the sections D are commonly discarded. In one embodiment the section D remains on the fiber without this affecting the determination of the length, $L_2$, of the up tapering. In one embodiment D does not affect the calculation of the up tapering because the section D resides after a substantial length of fiber with substantial constant diameter (i.e. more than 1 meter, such as more than 2 meter, such as more than 5 meters, such as more than 10 meters, such as more than 20 meters). In one embodiment D does not affect the calculation of the up tapering because the dimension of D is larger than the initial dimension. These considerations in the determination of a taper length may also be applied in other embodiments. FIG. 17b shows two of the tapers from the fiber of FIG. 17a superimposed so that the reproducibility of the taper can be observed. The measurement of the outer cladding diameter (i.e. of the diameter of the glass fiber before coating) was made during production. It should be noted that the x-axis is not a true representation of the length of the fiber because the position reflects the position on the capstan providing a constant line speed and not taking into account the path length increase imposed by the path length changing unit. It is observed that the outer cladding diameter is reduced about 24% at the taper waist, which correspond to similar decrease in the pitch of the fiber. The initial pitch of the fiber is 3.2 µm, which is reduced to about 2.4 µm at the taper waist. Similar tapers may be obtained with other dimensions of the fiber.

Figure 18:
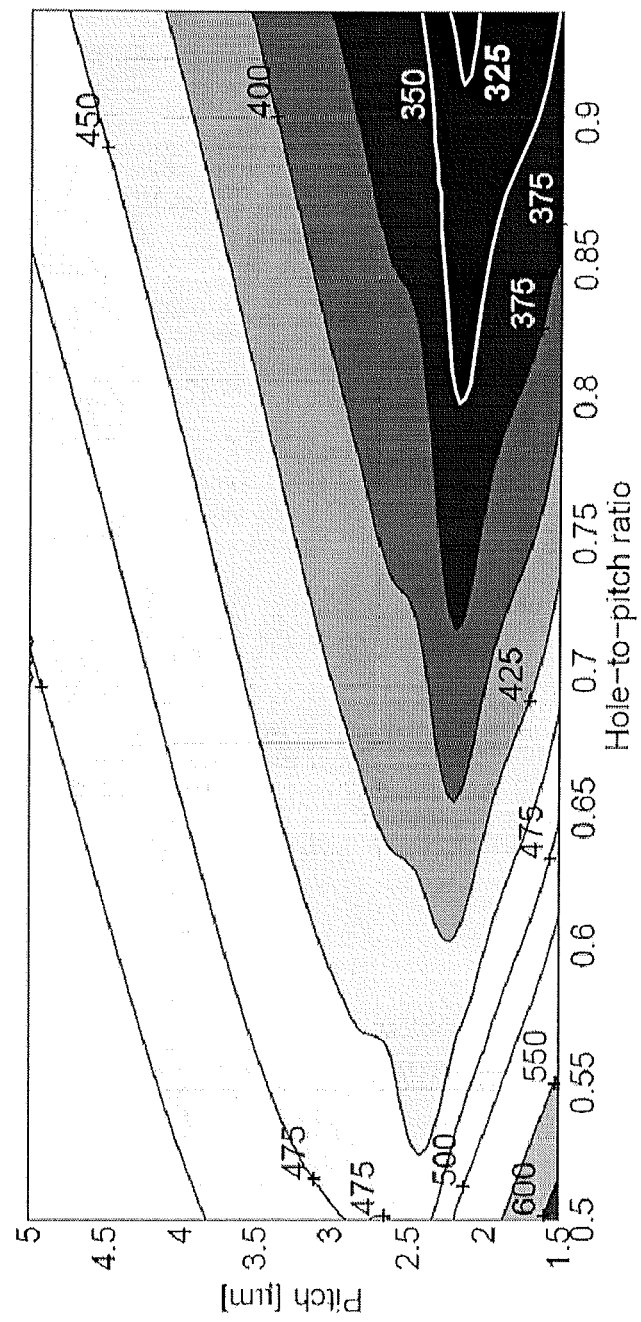
FIG. 18 shows a map of the potential blue edge for microstructured fiber made from pure silica with a cladding of microstructured air holes arranged in a triangular pattern.

FIG. 18 shows a theoretically calculated map of the wavelength of the blue edge as a function of $d_A/\Lambda$ and pitch, $\Lambda$, for a microstructured fiber of pure silica with a cladding formed by a hexagonal array of air holes. Often fibers according to the invention maintain substantial constant pitch through the taper and the blue edge of the dispersive waves (described above) is therefore shifted according to a substantial vertical along the y-axis. Similar maps may be produced for other configurations of the optical fiber, such as other base materials, material for the core, the cladding materials, and/or the structure of any microstructures. In this way the optimum design parameter may be obtained. In the present case it is noted that for a $d_A/\Lambda$ of 0.52, which is applied in most of the present examples, a minimum pitch of about 2.5 appears to be optimum for a low blue edge. As discussed above the shape of particularly the down taper is important for controlling the amount of the light that is coupled to the blue edge.

Figure 19:
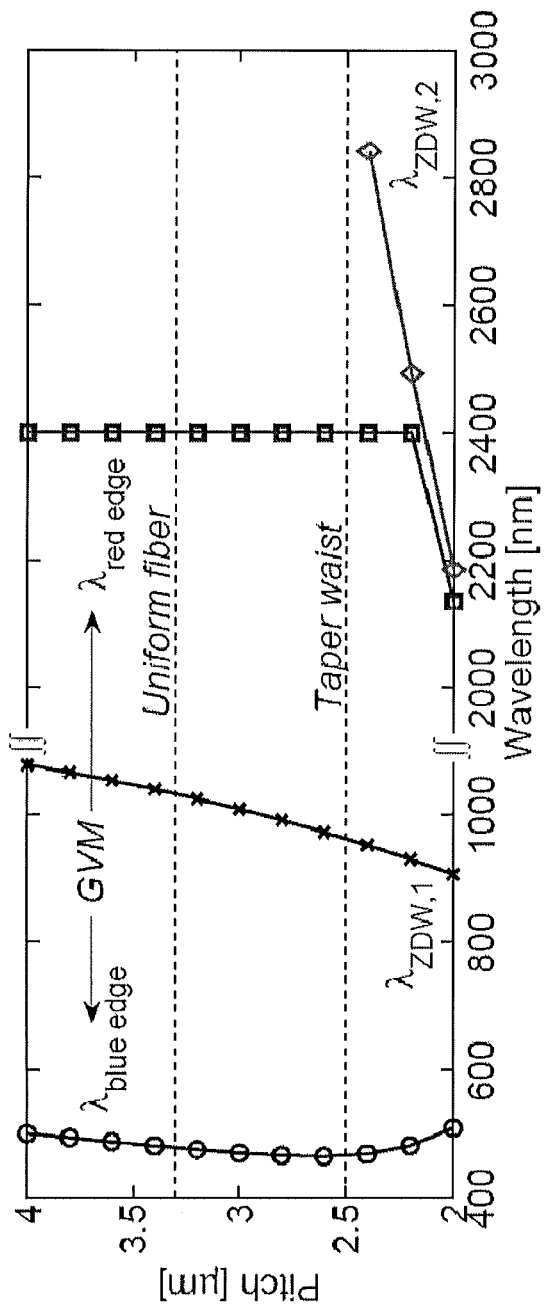
FIG. 19 shows an example of the change in the blue edge, ZDW and red edge with pitch for a microstructured fiber made from pure silica with a cladding of microstructured air holes arranged in a triangular pattern with a $d_f/\Lambda=0.52$.

FIG. 19 shows the ZDW, the blue edge, and the corresponding red edge between which a group velocity match (GVM) is established as a function of Pitch for constant $d_A/\Lambda$ of 0.52. As the pitch is reduced the blue edge reaches a minimum after which it increases again. As mentioned in relation to FIG. 18, a minimum pitch of about 2.5 appears to be optimum for a low blue edge for this example.

Figure 20A:
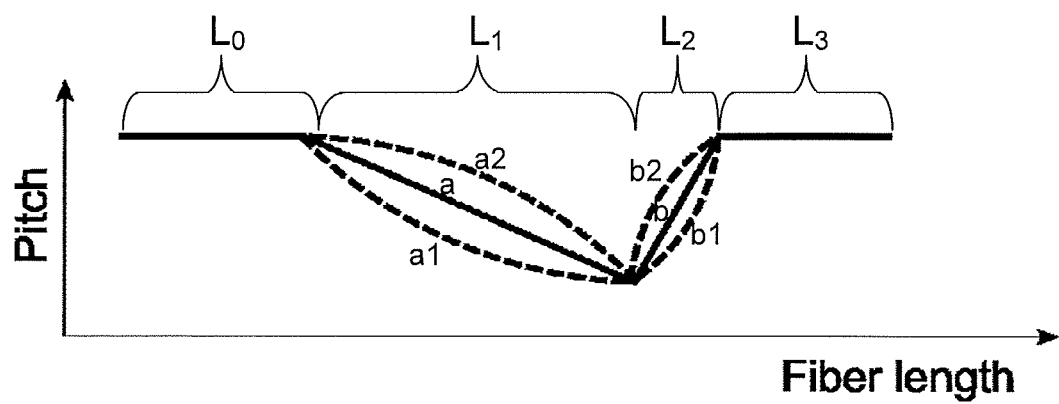
FIG. 20a shows an illustration of shapes of a taper according to the invention.
Figure 20B:
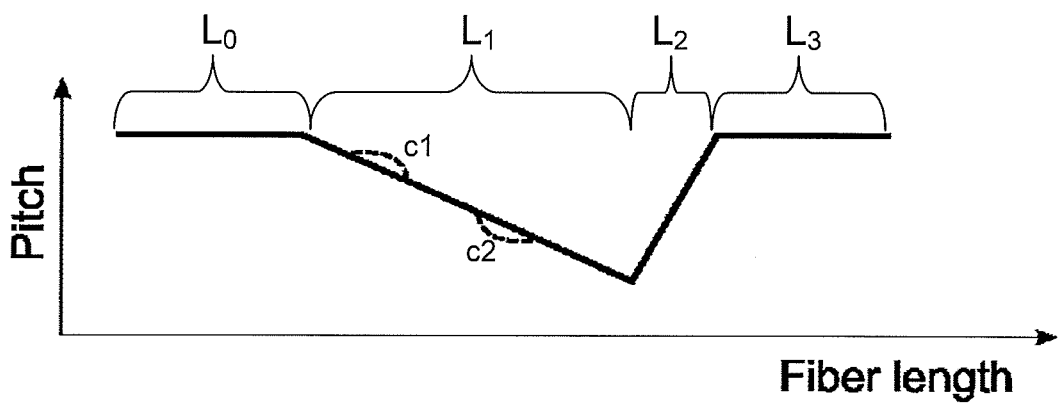
FIG. 20b illustrates that a taper according to the invention may further comprise indentations.

FIG. 20 shows examples of some of the shapes a taper according to the invention may take. In FIG. 20a the down taper may for example have a constant gradient along a, a concave shape along a2, or a convex shape along a1, all along the length $L_1$. Similarly, the up taper may for example have a constant gradient along b, a concave shape along b2, or a convex shape along b1, all along the length $L_2$. FIG. 20b illustrates that tapers of the invention may also comprise "bumps" such as c1 or c2 without this affecting the determination of the length of the taper. In one embodiment variations in the feature (here exemplified by the pitch), which are produced by post processing in a taper station, are disregarded in the determination of the lengths of the tapers. In one embodiment features that have an extent of less than 50 cm are ignored in the determination of the lengths of the tapers, such as less than 40 cm, such as less than 30 cm, such as less than 20 cm, such as less then 10 cm. Here extent is defined as deviation from the overall shape, such as for example the length of the dotted line indication c1.

Figure 21:
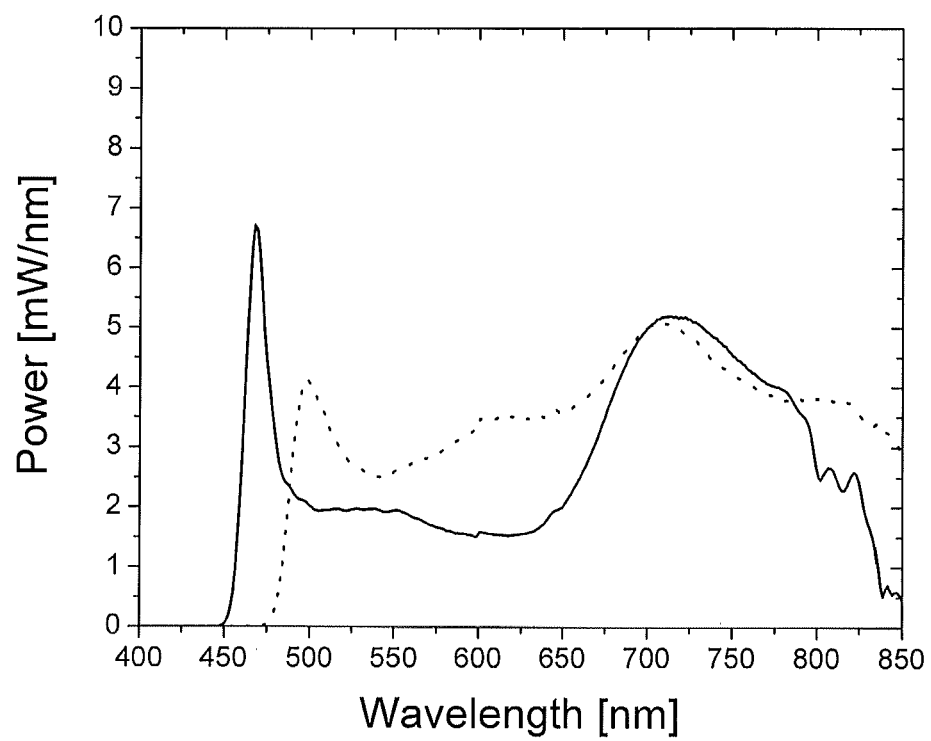
FIG. 21 shows spectra from a tapered fiber according to the invention compared with the corresponding untapered fiber with substantial equal amounts of pump light.

FIG. 21 shows supercontinua generated with a taper according to the invention. The lengths are $L_0$=1 m, $L_1$=7 m, $L_2$=1 m and $L_3$=1 m. For the untapered section $d_f/\Lambda$=0.52 and $\Lambda$=3.2 and at the waist $d_f/\Lambda$=0.52 and $\Lambda$=2.45. For comparison an untapered fiber was used (dotted line) with $d_f/\Lambda$=0.52 and $\Lambda$=3.25. Both fibers were pumped with a pulsed sourced with 10 ps pulses (FWHM) at 1064 nm and 80 MHz repetition rate. Comparable pulse powers were used: 14.7 W average power for the tapered fiber and 13 W average power for the untapered fiber. The figure shows that the tapering causes a redistribution of the light in visible range shown. The blue edge peak is enhanced and shifted about 30 nm. As predicted from FIG. 18, the location of the blue edge is found at about 450 nm for the tapered fibre (corresponding to a pitch of $\Lambda$=2.45) whereas the untapered fiber exhibits a blue edge at about 480 nm.

As laid out in the text above several embodiments are within the scope of the present invention and several embodiments are available for each feature of fiber, light source and drawing tower according to the invention. It should be noted that all such embodiments are intended to be combinable unless the features are clearly mutually exclusive. The invention and embodiments thereof are further defined by the attached set of claims.

The invention claimed is:

1. A tapered microstructured optical fiber for super continuum generation comprising a plurality of a first type of element having first element diameter, $d_f$, being arranged at a pitch of $\Lambda$, wherein said tapered optical fiber comprises a core region that is capable of guiding light at a first wavelength along a longitudinal axis of said optical fiber and a cladding region surrounding said core region, said optical fiber comprising a tapered section arranged between a first longitudinal position and a second longitudinal position, said tapered section comprising a first taper section having a first length, $L_1$, over which the optical fiber is tapered down to a taper waist, and a second taper section having a second length, $L_2$, over which said optical fiber is tapered up, wherein $L_1$ is more than about 1 m and wherein the core area at said taper waist is smaller than about 15 $\mu m^2$.

2. The tapered optical fiber according to claim 1, where $L_2$=y·$L_1$, where y is smaller than about 0.7.

3. The tapered optical fiber according to claim 1, where said core region is tapered down over said first taper section from a first core area, $A_1$, at said first longitudinal position to a waist core area, $A_w$, at said taper waist, and said core region is tapered up over said second taper section to a second core area, $A_2$, at said second longitudinal position, wherein $A_1$ is substantially identical to $A_2$.

4. The tapered optical fiber according to claim 1, wherein said taper waist is comprised in a waist section extending along the longitudinal axis of the tapered optical fiber over a waist length, $L_W$, said waist section being arranged between the first taper section and the second taper section, wherein any variations in the core area over said waist section is less than about 5%.

5. The tapered optical fiber according to claim 1, wherein the ratio $d_f/\Lambda$ at least along a part of said optical fiber is in the range from about 0.3 to about 0.95.

6. The tapered optical fiber according to claim 1, wherein said down-tapering reduces said pitch, such that the ratio between the pitch in said waist section and the pitch at said first longitudinal position is below about below about 0.8.

7. The tapered optical fiber according to claim 1, where the length of said waist section, $L_W$, is larger than the length of said second taper section, $L_2$.

8. The tapered optical fiber according to claim 1, wherein said second length is below about 3 m.

9. The tapered optical fiber according to claim 1, wherein said waist length, $L_W$, is more than about 0.5 m.

10. The tapered optical fiber according to claim 1, comprising a material selected from silica glass, chalcogenide glass, soft glasses, or polymer material.

11. The tapered optical fiber according to claim 1 in combination with a pump source arranged to inject light pulses in the pico-second range into said microstructured optical fiber, to provide a supercontinuum light source.

12. The tapered optical fiber according to claim 1, wherein said microstructure elements comprises a plurality of a first type of element having first element diameter, $d_f$, said first type of elements being arranged at a pitch of $\Lambda$.

13. The tapered optical fiber according to claim 12, wherein the ratio between said first element diameter and said pitch, $d_f/\Lambda$, is substantially constant along the first taper section and/or the second taper section and/or the waist section.

14. The tapered optical fiber according to claim 1, wherein said second length, $L_2$, is below about 10 m.

15. The tapered optical fiber according to claim 1, wherein the sum of the lengths of the first and second taper sections, $L_1+L_2$, is larger than about 1 m.

16. A supercontinuum light source comprising a microstructured optical fiber of claim 1 and a pump source arranged to inject light pulses in the pico-second range into said microstructured optical fiber.

17. The supercontinuum light source according to claim 16 wherein the tapered optical fiber has a core region with an input core area, $A_{in}$, at an input end of said optical fiber and an output core area, $A_{out}$, at an output end of said optical fiber, said core region supporting at least a fundamental mode for light at a first wavelength, $\lambda_1$.

18. The supercontinuum light source according to claim 17 wherein the inject light pulses are in form of pump light having an optical peak power, P, a centre wavelength, $\lambda_{centre}$, and a spectral width, $\Delta\lambda$.

19. A method for producing a microstructured tapered optical fiber from a fiber preform comprising at least a first material, said method comprising fixating said fiber preform in a preform holder
arranging said preform holder in relation to a drawing tower comprising a capstan and a heating device capable of heating at least a part of said fiber preform;

heating at least a part of said fiber preform in said heating device, feeding at a feeding velocity said fiber preform into said heating device;

drawing said optical fiber from a first end of said heated fiber preform at a line speed by applying a pulling force to said first end, said pulling force being applied by a capstan where said capstan provides an acceleration or a deceleration such that said line speed changes from a first line speed to a second line speed during a shorter time interval, said first line speed differing by more than about 10% from said second line speed, and said shorter time interval being less than about 10 seconds.

20. The method according claim 19, wherein said line speed is a sum of a contribution from a first capstan unit, which is capable of providing a substantially constant line speed during a longer time interval, and a contribution from a line speed changing unit capable of providing said acceleration and/or deceleration during said shorter time interval.

21. The method according to claim 19, wherein said line speed changing unit changes its contribution to the line speed by increasing or decreasing the length of a fiber path followed by the drawn optical fiber from the first end of said preform to said first capstan unit.

22. The method according to claim 19, wherein a length of the drawn optical fiber during the shorter time interval is displaced from following a first path to following a second path, where said second path differs in length from said first path, said displacement optionally being provided by a displacing unit comprised in a line speed changing unit capable of providing an acceleration and/or deceleration over said shorter time interval.

23. The method according to claim 19, wherein said fiber preform comprises at least a first air hole and a second end of said fiber preform is arranged in a preform holder comprising a substantially air tight first lumen being in fluid connection with at least said first air hole and with at least a first pressure controller, said first air hole being pressurized to a first pressure during at least a part of the drawing of the tapered optical fiber.

24. The method according to claim 23, wherein said fiber preform further comprises at least a second air hole and said preform holder comprises a substantially air tight second lumen in fluid connection with at least said second air hole and at least a second pressure controller, said second air hole being pressurized to a second pressure differing from said first pressure during at least a part of the drawing of the tapered optical fiber.

25. The method according to claim 19, wherein the perform comprises at least a first group of air holes and the optical fiber is drawn using a drawing tower system comprising a pressure control system for pressurizing said first group of air holes; wherein the pressure control system comprises a first enclosure and a flow system arranged for connecting said first enclosure and the first group of air holes via a flow path, said pressure control system comprising a pump for pressurizing said first enclosure, said flow system comprising an on/off valve which is capable of opening within a first period of time $\Delta t_1$, the method comprising bringing said first enclosure into fluid contact with said first group of air holes when said valve is opened, wherein $\Delta t_1$, is smaller than about 10 seconds.

* * * * *